(12) United States Patent
Wu et al.

(10) Patent No.: US 7,395,203 B2
(45) Date of Patent: Jul. 1, 2008

(54) SYSTEM AND METHOD FOR DISAMBIGUATING PHONETIC INPUT

(75) Inventors: Jianchao Wu, Sammamish, WA (US); Jenny Huang-Yu Lai, Seattle, WA (US); Lian He, Kirkland, WA (US); Pim van Meurs, Kenmore, WA (US); Keng Chong Wong, Seattle, WA (US); Lu Zhang, Bothell, WA (US)

(73) Assignee: Tegic Communications, Inc., Seattle, WA (US)

( * ) Notice: Subject to any disclaimer, the term of this patent is extended or adjusted under 35 U.S.C. 154(b) by 887 days.

(21) Appl. No.: 10/631,543

(22) Filed: Jul. 30, 2003

(65) Prior Publication Data

US 2005/0027524 A1    Feb. 3, 2005

(51) Int. Cl.
*G10L 15/28* (2006.01)
*G06F 17/27* (2006.01)
*G10L 21/00* (2006.01)

(52) U.S. Cl. .............................. 704/235; 704/9; 704/1; 704/270

(58) Field of Classification Search .................... 704/1, 704/260, 9, 270–275, 201, 235; 715/535, 715/703; 400/110
See application file for complete search history.

(56) References Cited

U.S. PATENT DOCUMENTS

| | | | | |
|---|---|---|---|---|
| 4,096,934 A | * | 6/1978 | Kirmser et al. | 400/110 |
| 4,379,288 A | | 4/1983 | Leung et al. | 340/365 |
| 4,544,276 A | * | 10/1985 | Horodeck | 400/110 |
| 4,679,951 A | | 7/1987 | King et al. | 400/110 |
| 4,868,913 A | | 9/1989 | Tse-Kai | 340/711 |
| 4,951,202 A | | 8/1990 | Yan | 364/419 |
| 5,119,296 A | | 6/1992 | Zheng et al. | 364/419 |
| 5,164,900 A | * | 11/1992 | Bernath | 715/535 |
| 5,175,803 A | | 12/1992 | Yeh | 395/100 |
| 5,197,810 A | | 3/1993 | Zhang et al. | 400/110 |

(Continued)

FOREIGN PATENT DOCUMENTS

EP    271 619    6/1988

(Continued)

OTHER PUBLICATIONS

Arnott, J.L., et al; *Probabilistic Character Disambiguation for Reduced Keyboards Using Small Text Samples*; Dept. Math & Comp. Sci.; Univ of Dundee, Dundee, Tayside, Scotland; AAC Augmentative and Alternative Communication; vol. 8, Sep. 1992; Copyright 1992 by ISAAC.

(Continued)

*Primary Examiner*—Vijay Chawan
(74) *Attorney, Agent, or Firm*—Michael A. Glenn; Glenn Patent Group

(57) ABSTRACT

A system and method for inputting Chinese characters using Pinyin without requiring the entry of a delimiter key between Pinyin entries in a reduced keyboard is disclosed. The system searches for all possible single or multiple Pinyin spellings based on the entered Latin alphabets. Once the user has completed the inputting of the Pinyin spellings for desired Chinese phrase or characters, all possible matching phrases or characters are displayed on screen and off-screen due to screen size. The user then scrolls through a list of matching phrases or characters and selects the desired one by clicking.

106 Claims, 13 Drawing Sheets

U.S. PATENT DOCUMENTS

| | | | | |
|---|---|---|---|---|
| 5,212,638 | A | 5/1993 | Bernath | 364/419 |
| 5,270,927 | A | 12/1993 | Sproat | 364/419.09 |
| 5,319,386 | A | 6/1994 | Gunn et al. | 345/173 |
| 5,360,343 | A | 11/1994 | Tang | 434/118 |
| 5,410,306 | A | 4/1995 | Ye | 341/28 |
| 5,835,924 | A | 11/1998 | Maruyama et al. | 707/535 |
| 5,893,133 | A | 4/1999 | Chen | 707/535 |
| 5,903,861 | A | 5/1999 | Chan | 704/9 |
| 5,952,942 | A | 9/1999 | Balakrishnan et al. | 341/20 |
| 5,999,895 | A * | 12/1999 | Forest | 704/1 |
| 6,005,498 | A | 12/1999 | Yang et al. | 341/23 |
| 6,009,444 | A | 12/1999 | Chen | 707/535 |
| 6,014,615 | A | 1/2000 | Chen | 704/3 |
| 6,073,146 | A | 6/2000 | Chen | 707/535 |
| 6,094,634 | A * | 7/2000 | Yahagi et al. | 704/260 |
| 6,292,768 | B1 | 9/2001 | Chan | 704/1 |
| 6,362,752 | B1 | 3/2002 | Guo et al. | 341/28 |
| 6,487,424 | B1 | 11/2002 | Kraft et al. | 455/566 |
| 6,801,659 | B1 | 10/2004 | O'Dell | |
| 6,848,080 | B1 | 1/2005 | Lee | |
| 7,020,849 | B1 | 3/2006 | Chen | |
| 2002/0045463 | A1 | 4/2002 | Chen et al. | 455/566 |
| 2002/0158779 | A1 | 10/2002 | Ouyang | 341/28 |
| 2003/0179930 | A1 | 9/2003 | O' Dell et al. | |
| 2006/0248459 | A1* | 11/2006 | Su | 715/703 |

FOREIGN PATENT DOCUMENTS

| | | |
|---|---|---|
| EP | 930 760 | 7/1999 |
| EP | 1 085 401 | 3/2001 |
| GB | 2 359 398 | 8/2001 |
| JP | 1986-194560 | 8/1986 |
| JP | 1997-128383 | 5/1997 |
| JP | 2001-125720 | 11/2001 |
| JP | 2002-014954 | 1/2002 |
| JP | 2003-514304 | 4/2003 |
| KR | 1020030005546 A | 1/2003 |
| WO | WO 01/90879 | 11/2001 |
| WO | WO 01/95051 | 12/2001 |
| WO | WO 01/98939 | 12/2001 |
| WO | WO/2005/043369 A1 | 8/2004 |
| WO | WO 2004/111812 | 12/2004 |
| WO | WO 2004/111871 | 12/2004 |
| WO | WO 2006/026908 | 3/2006 |

OTHER PUBLICATIONS

*A Roman-Chinese Character Conversion System Correcting Pinyin Spelling Errors With Application To The Chinese FEP*; Ye, B.; Kawakami, H.; Matsumoto, T.; Goto, M.; IEICE Transactions on Information and Systems; May 2000.

*A Neural Network For Disambiguating Pinyin Chinese Input*; Yuan, M.; Kunst, R.A.; Borchardt, F.L.; CALICO '94 Annual Symposium. Proceedings of the Computer Assisted Language Instruction Consortium. 1994 Annual Symposium. 'Human Factors'; 1994.

*A New Statistical Approach to Chinese Pinyin Input*; Z. Chen, K. Lee, Microsoft Research China.

*Improved Trie-Like Structure For Input Of Chinese Character By "Full-Pinyin" And Its Automatic Generation*; Wang Bo-wen; Su Guo-hui; Mini-Micro Systems; Jun. 2002.

*Chinese Input With Keyboard And Eye-Tracking—An Anatomical Study*; Jingtao Wang; Shumin Zhai; Hui Su; CHI 2001 Conference Proceedings. Conference on Human Factors in Computing Systems; 2001.

*A Sentence-Level Chinese Character Input Method*; Xu Zhiming; Wang Xiaolong; Jiang Shouxu; High Technology Letters; Jan. 2000.

*Recombinant Chinese Pinyin System For Efficient Processing Of Information In Chinese*; Computer Standards & Interfaces; Nov. 16, 1998.

*Entropies Of Chinese Texts Based On Three Models Of Hanyu Pinyin Phonetic System*; Huang, S.Y.; Ong, G.H.; Proceedings of IEEE Singapore International Conference on Networks/International Conference on Information Engineering '93. Theme:Communications and Networks for the Year 2000; 1993.

*A Chinese Character Retrieval Scheme Using Shuang Pinyin*; Chen, J.N.; Chang, C.C.; Journal of Information Science and Engineering; Sep. 1992.

*A Touch-Typing Pinyin Input System*; Lua, K.T.; Gan, K.W.; Computer Processing of Chinese & Oriental Languages; Jun. 1992.

*A Method For Inputting Chinese Characters Using Pinyin And Virtual Keyboards*; Chen, J.; Onda, K.; Aoki, Y.; Transactions of the Institute of Electronics, Information and Communication Engineers D-II; Apr. 1989.

*An Efficient Data Structure For Hanyu Pinyin Input System*; Gee-Swee Poo; Beng-Cheng Lim; Tan, E.; Computer Processing of Chinese & Oriental Languages; Nov. 198.

*Pinyin-International Keyboard*; Apollo Wu; Hille, H.; 1988 International Conference on Computer Processing of Chinese and Oriental Languages. Proceedings; 1988.

*A New Input Method And Its Keyboard Arrangement Considering The Sound And Shape Of The Chinese Characters*; Chen, J.; Onda, K.; Aoki, Y.; Transactions of the Institute of Electronics, Information and Communication Engineers D; 1988.

*Pinyin-Kanji Translation Of The Chinese Word Processor*; Tosa, M.; Yoshikawa, K.; Marata, S.; Chiba, T.; Tamura, T.; Watanabe, K.; Ogura, H.; Satoh, M.; Sharp Technical Journal; 1987.

*Four-Corner-Plus-Pinyin Method For Chinese Character Encoding*; IBM Technical Disclosure Bulletin; Oct. 1986.

*A Pinyin Keyboard For Inputting Chinese Characters*; Sheng, J.; Computer; Jan. 1985.

* cited by examiner

SYSTEM AND METHOD FOR DISAMBIGUATING PHONETIC INPUT

BACKGROUND OF THE INVENTION

1. Technical Field

This invention relates generally to Chinese input technology. More particularly, the invention relates to a system and method for disambiguating phonetic entry.

2. Description of the Prior Art

For many years, the keyboard size has been a major size-limiting factor in the efforts to design and manufacture small portable computers because if standard typewriter-size keys are used, a portable computer must be at least as large as the keyboard. Although a variety of miniaturized keyboards have been used on portable computers, they have been found too small to be easily or quickly manipulated by a regular user.

Incorporating a full-size keyboard in a portable computer also hinders true portable use of the computer. Most portable computers cannot be operated without placing the computer on a substantially flat work surface to allow the user to type with both hands. The user cannot easily use a portable computer while standing or moving. In the latest generation of small portable computers, called Personal Digital Assistants (PDAs) or palm-sized computers, manufacturers have attempted to address this problem by incorporating handwriting recognition software in the device. Users may directly enter text by writing on a touch-sensitive panel or screen. This handwritten text is then converted by the recognition software into digital data. Unfortunately, in addition to the fact that printing or writing with a pen is in general slower than typing, the accuracy and speed of the handwriting recognition software has to date been less than satisfactory. In the case of Chinese language, with its large number of complex characters, the problem becomes especially difficult. To make matters worse, today's handheld computing devices which require text input are becoming smaller still. Recent advances in two-way paging, cellular telephones, and other portable wireless technologies have led to a demand for small and portable two-way messaging systems, and especially for systems which can both send and receive electronic mail ("e-mail").

Pinyin input method is one of the most commonly used Chinese character input method based on Pinyin, the official system of sounds forming syllables for Chinese language which was introduced in 1958 by the People's Republic of China. It is supplementary to the 5,000-year-old traditional Chinese writing system. Pinyin is used in many different ways. For examples: it is used as a pronunciation tool for language learners; it is used in index systems; and it is used for inputting Chinese characters into a computer. The Pinyin system adopts the standard Latin alphabets and takes the traditional Chinese analysis of the Chinese syllable into initials, finals (ending sounds) and tones.

Mandarin Chinese has consonant sounds that are found in most of the languages. For example, b, p, m, f, d, t, n, l, g, k, h are quite close to English. Other initial sounds, such as retroflex sounds zh, ch, sh and r, palatal sounds j, q and x, as well as dental sounds z, c and s, are different from English or Latin pronunciation. Table 1 lists all initial sounds according to the Pinyin system.

TABLE 1

Initial Sounds

| Initial Sound | Pronunciation sample | Note |
|---|---|---|
| Group I: Same pronunciation as in English | | |
| M | Man | |
| N | No | |
| L | Letter | |
| F | From | |
| S | Sun | |
| W | Woman | |
| Y | Yes | |
| Group II: Slightly Different from English Pronunciation | | |
| P | Pun | use a strong puff of breath |
| K | Cola | use a strong puff of breath |
| T | Tongue | use a strong puff of breath |
| B | Bum | no puff of breath |
| D | Dung | no puff of breath |
| G | Good | no puff of breath |
| H | Hot | slightly more aspirated than in English |
| Group III: Different from English Pronunciation | | |
| ZH | Jeweler | |
| CH | | As in ZH but with a strong puff of breath |
| SH | Shoe | |
| R | Run | |
| C | | Like "ts" in "it's high", but with a strong puff of breath |
| J | Jeff | |
| Q | | Close to "ch" in "Cheese" |
| X | | Close to "sh" in "sheep" |

The finals connect with the initial sounds to create a Pinyin syllable which corresponds to a Chinese character (zi: _). A Chinese phrase (ci: _) usually consists of two or more Chinese characters. Table 2 lists all the final sounds according to the Pinyin system and Table 3 gives some examples illustrating the combination of initials and finals.

TABLE 2

Final (ending) Sounds

| Final Sound | Pronunciation sample |
|---|---|
| a | As in father |
| an | Like the sounds of "Anne" |
| ang | Like the sound "an" with addition of "g" |
| ai | As in "high" |
| ao | As in "how" |
| ar | As in "bar" |
| o | Like "aw" |
| ou | Like the "ow" in "low" |
| ong | Like the "ung" in "jungle" with a slight "oo" sound |
| e | Sounds like "uh" |
| en | Like the "un" in "under" |
| eng | Like the "ung" in "lung" |
| ei | Like the "ei" in "eight" |
| er | Like the "er" in "herd" |
| i | Like the "i" in machine |
| in | As in "bin" |
| ing | Like "sing" |
| u | Like the "oo" in "loop" |
| un | As in "fun" |

TABLE 3

Putting Initials and Final (ending) Together

| Pinyin | Pronunciation sample |
|---|---|
| Ni | Like "knee" |
| Hao | Like "how" with a little more aspiration |
| Dong | Like "doong" |
| Qi | Like "Chee" |
| Gong | Like "Gung" |
| Tai | Like "Tie" |
| Ji | Like "Gee" |
| Quan | Like "Chwan" |

Each Pinyin pronunciation has one of the five tones (four pitched tones and a "toneless" tone) of Mandarin Chinese. A tone is important to the meaning of the word. The reason for having these tones is probably that Chinese language has very few possible syllables—approximately 400—while English has about 12,000. For this reason, there may be more homophonic words, i.e. words with the same sound expressing different meanings, in Chinese than in most other languages. Apparently tones help the relatively small number of syllables to multiply and thereby alleviate but not completely solve the problem. There is no paralleling concept of the tones in English. In English, an incorrect inflection of a sentence can render the sentence difficult to understand. But in Chinese an incorrect intonation of a single word can completely change its meaning. For example, the syllable "da" may represents several characters such as _ in first tone (da1) meaning "to hang over something", _ in second tone (da2) meaning "to answer", _ in third tone (da3) meaning "to hit", and _ in fourth tone (da4) meaning "big". The numbers after each of the syllables indicates the tones. The tones are also indicated by marks such as d_da_d_da_. Table 4 shows a description of five tones for the syllable "da".

TABLE 4

Five Tones

| Tone | Mark | Description |
|---|---|---|
| 1st | d_ | High and level |
| 2nd | da_ | Starts medium in tone, then rises to the top |
| 3rd | d_ | Starts low, dips to the bottom, then rises toward the top |
| 4th | da_ | Starts at the top, then falls sharp and strong to the bottom |
| Neutral | da | Flat, with no emphasis |

To enter a Chinese character using the Pinyin system, the user selects English letters corresponding to the character's Pinyin spelling. For example, on a standard QWERTY keyboard, when the user wants a Chinese character with a Pinyin of "ni", he needs to press the "N" key and then the "I" key. After the "N" key and the "I" key are pressed, a list of Chinese characters associated with the Pinyin spelling "NI" is displayed. Then, the user selects the intended character from the list. This method is hereby referred as the basic Pinyin input method.

In a reduced keyboard system, such as one shown in FIG. 1, each key is associated with more than one letters of the Latin alphabet corresponding to each Pinyin syllable as shown in Tables 1 and 2. Thus a disambiguating method is needed for determining the correct Pinyin spellings that correspond to the input keystroke sequence.

A number of suggested approaches for determining the correct character sequence that corresponds to an ambiguous keystroke sequence are summarized in the article "Probabilistic Character Disambiguation for Reduced Keyboards Using Small Text Samples" by John L. Arnott and Muhammad Y. Javad (hereinafter as Arnott), which was published in the Journal of the International Society for Augmentative and Alternative Communication. Arnott notes that the majority of disambiguation approaches employ known statistics of character sequences in the relevant language to resolve character ambiguity in a given context. That is, existing disambiguating systems statistically analyze ambiguous keystroke groupings as they are being entered by a user to determine the appropriate interpretation of the keystrokes. Arnott also notes that several disambiguating systems have attempted to use word level disambiguation to decode text from a reduced keyboard. Word level disambiguation processes complete words by comparing the entire sequence of received keystrokes with possible matches in a dictionary after the receipt of an unambiguous character signifying the end of the word. Arnott points out several disadvantages of word-level disambiguation. For example, word level disambiguation often fails to decode a word correctly due to the limitations in identifying unusual words and the inability to decode words that are not contained in the dictionary. Because of the decoding limitations, word level disambiguation does not give error-free decoding of unconstrained English text with an efficiency of one keystroke per character. Arnott thus concentrates on character level disambiguation rather than word level disambiguation, and indicates that character level disambiguation appears to be the most promising disambiguation technique.

Still another suggested approach is disclosed in a textbook entitled *Principles of Computer Speech*, which was authored by I. El. Witten and published by Academic Press in 1982 (hereinafter as Witten). Witten discusses a system for reducing ambiguity from text entered using a telephone touch pad. Witten recognizes that for approximately 92% of the words in a 24,500 word English dictionary, no ambiguity arises when comparing the keystroke sequence with the dictionary. When ambiguities do arise, however, Witten notes that they must be resolved interactively by the system presenting the ambiguity to the user and asking the user to make a selection among the list of ambiguous entries. The user must therefore respond to the system's prediction at the end of each word. Such a response slows the efficiency of the system and increases the number of keystrokes required to enter a given segment of text.

Disambiguating an ambiguous keystroke sequence continues to be a challenging problem. As noted in the publications discussed above, existing solutions that minimize the number of keystrokes required to enter a segment of text have failed to achieve the necessary efficiencies to be acceptable for use in a portable computer. It would therefore be desirable to develop a disambiguating system that resolves the ambiguity of entered keystrokes while minimizing the total number of keystrokes required, within the context of a simple and easy to understand user interface. Such a system would thereby maximize the efficiency of text entry.

An effective reduced keyboard input system for Chinese language must satisfy all of the following criteria. First, the input method must be easy for a native speaker to understand and learn to use. Second, the system must tend to minimize the number of keystrokes required to enter text in order to enhance the efficiency of the reduced keyboard system. Third, the system must reduce the cognitive load on the user by reducing the amount of attention and decision-making required during the input process. Fourth, the approach should minimize the amount of memory and processing resources needed to implement a practical system.

The basic Pinyin method can be applied to a reduced keyboard input system when combined with a non-ambiguous method of input Latin alphabets such as the multi-tap method. All non-ambiguous method, however, requires lots of key strokes, which is especially burdensome when combined with the basic Pinyin method. Thus it is preferable to combine the basic Pinyin method with a disambiguating system. One approach is developed to disambiguate only one Pinyin syllable at one time by requiring the user to select a delimiter key, such as key 1 or key 0, between Pinyin spellings that correspond to multiple Chinese characters in commonly known Chinese phrases (_, i.e. a word with more than one character). The selection of the delimiter key instructs the processor to search for Pinyin syllables that match the input sequence and for Chinese characters associated with the first Pinyin syllable which may be selected by default. As shown in FIG. 1, the user is trying to input the Chinese characters associated with the Pinyin spellings NI and Y. To do this, the user would first select the '6' key 16, then the '4' key 14. In order to instruct the processor to perform a search for a syllable matching the keys entered, the user then selects the delimiter key 10 and finally the '9' key 19. Because this process requires a delimiter key depression between commonly linked multiple Chinese character words, time is wasted.

Another significant challenge facing an application of word-level disambiguation is how to successfully implement it on types of hardware platforms on which its use is most advantageous, such as two-way pagers, cellular telephones, and other hand-held wireless communications devices. These systems are battery powered, and consequently are designed to be as frugal as possible in hardware design and resource utilization. Applications designed to run on such systems must minimize both processor bandwidth utilization and memory requirements. These two factors tend in general to be inversely related. Since word-level disambiguation systems require a large database of words to function, and must respond quickly to input keystrokes to provide a satisfactory user interface, it would be a great advantage to be able to compress the required database without significantly impacting the processing time required to utilize it. In the case of Chinese language, additional information must be included in the database to support the conversion of sequences of Pinyin syllables to the Chinese phrases intended by the user.

Another challenge facing any application of word-level disambiguation is how to provide sufficient feedback to the user about the keystrokes being input. With an ordinary typewriter or word processor, each keystroke represents a unique character which can be displayed to the user as soon as it is entered. However, with word-level disambiguation this is often not possible because each keystroke represents multiple letters in a Pinyin spelling and any sequence of keystrokes may match multiple spellings or partial spellings. It would therefore be desirable to develop a disambiguating system that minimizes the ambiguity of entered keystrokes and also maximizes the efficiency with which the user can resolve any ambiguity which does arise during text entry. One way to increase the user's efficiency is to provide appropriate feedback following each keystroke, which includes displaying the most likely word spelling following each keystroke, and in cases where the current keystroke sequence does not correspond to a completed word, displaying the most likely stem of a yet uncompleted word.

SUMMARY OF THE INVENTION

The system according to this invention eliminates the need for entering a delimiter key between phonetic, e.g. Pinyin, entries in a reduced keyboard. The system searches for all possible single or multiple Pinyin spellings based on the entered key sequence without requiring the entry of a delimiter. Once the user has completed a desired Chinese phrase or a group of Chinese characters through entry of the associated Pinyin words, the user selects the desired displayed pairings of Chinese characters, or scrolls through a list of Chinese characters that may be stored off-screen due to screen size.

In one preferred embodiment, a system is disclosed for disambiguating ambiguous input sequences entered by a user and generating textual output in Chinese language. The system includes: (1) a user input device having a plurality of input means, each of the input means being associated with a plurality of phonetic characters, an input sequence being generated each time when an input is selected by the user input device, the generated input sequence having a textual interpretation that is ambiguous due to the plurality of phonetic characters associated with the inputs; (2) a database containing a plurality of input sequences and, associated with each input sequence, a set of phonetic sequences whose spellings correspond to the input sequence; (3) a database containing a plurality of phonetic sequences and, associated with each phonetic sequence, a set of ideographic character sequences which correspond to the phonetic sequences; (4) means for comparing the input sequence with the phonetic sequence database and finding matching phonetic entries; (5) means for matching the phonetic entries with the ideographic database; and (6) an output device for displaying one or more matched phonetic entries and matched ideographic characters.

In another preferred embodiment, an ideographic language text input system incorporated in a user input device is disclosed. The system includes: (1) a plurality of inputs, each of the plurality of inputs associated with a plurality of characters, an input sequence being generated each time an input is selected by manipulating the user input device, wherein a generated input sequence corresponds to a sequence of inputs that have been selected; (2) at least one selection input for generating an object output, wherein an input sequence is terminated when the user manipulates the user input device to a selection input; (3) a memory containing a plurality of objects, wherein each of the plurality of objects is associated with an input sequence; (4) a display to depict system output to the user; and (5) a processor coupled to the user input device, memory, and display. The processor further includes an identifying means for identifying from the plurality of objects in the memory any object associated with each generated input sequence, an output means for displaying on the display the character interpretation of any identified objects associated with each generated input sequence, and a selection means for selecting the desired character for entry into a text entry display location upon detecting the manipulation of the user input device to a selection input.

In another preferred embodiment of the invention, a disambiguating system is disclosed for disambiguating ambiguous input sequences entered by a user and generating textual output in Chinese language. The disambiguating system includes a user input device having a plurality of input means, a memory, a display and a processor. Each of the input means of the user input device is associated with a plurality of Latin alphabets. An input sequence is generated each time an input is selected by the user input device, and the generated input sequence has a textual interpretation that is ambiguous due to the plurality of Latin alphabets associated with the inputs. The memory contains data used to construct a plurality of phonetic, e.g. Pinyin, spellings, which are associated with an input sequence and a frequency of use based on a linguistic model (FUBLM). FUBLM typically includes frequency of use of the actual phrases as well as predictions based on grammatical or even semantic models. Each of the plurality of Pinyin spellings includes a sequence of Pinyin syllables which correspond to the phonetic reading to be output to the user and are constructed from data stored in the memory in certain data structure. In the preferred embodiment, the data are stored in a tree structure comprised of a plurality of nodes and optionally a grammatical or semantic linguistic model which combines one or more phrases found in the tree structure. Each node is associated with an input sequence. The display depicts system output to the user. The processor is coupled to the user input device, memory and display. The processor constructs a Pinyin spelling from the data in the memory associated with each input sequence and identifies at least one candidate Pinyin spelling with the highest FUBLM. The processor then generates an output signal causing the display to display the identified candidate Pinyin spelling associated with each generated input sequence as a textual interpretation of the generated sequence.

The Pinyin spelling objects in the tree structure in memory is associated with one or more Chinese phrases, which is a textual interpretation of the associated Pinyin spelling object. Each Chinese phrase object is associated with a FUBLM.

The processor also constructs at least one identified candidate Chinese phrase for a selected Pinyin spelling and generates an output signal causing the display to display the identified candidate Chinese phrases associated with the selected Pinyin spelling associated with each generated input sequence as a textual interpretation of the generated sequence.

In another preferred embodiment of the invention, a method is disclosed for disambiguating ambiguous input sequences entered by a user with a user input device and generating textual output in Chinese language. The user input device includes: (1) a plurality of input means, each of the input means being associated with a plurality of phonetic characters, an input sequence being generated each time when an input is selected by the user input device, wherein the generated input sequence has a textual interpretation that is ambiguous due to the plurality of phonetic characters associated with the inputs; (2) data consisting of a plurality of input sequences and, associated with each input sequence, a set of phonetic sequences whose spellings correspond to the input sequence; and (3) a database containing a plurality of phonetic sequences and, associated with each phonetic sequence, a set of ideographic character sequences which correspond to the phonetic sequences.

The method includes the steps of: entering an input sequence into a user input device; comparing the input sequence with the phonetic sequence database and finding matching phonetic entries; displaying optionally one or more matched phonetic entries; matching the phonetic entries with the ideographic database; and optionally displaying one or more matched ideographic characters.

Yet in another preferred embodiment of the invention, a method is disclosed for disambiguating an input sequence generated by a user using a reduced keyboard including a plurality of input means. The reduced keyboard is coupled with a memory including a vocabulary module tree, which includes tree nodes corresponding to the input means. The tree nodes are linked by input sequences which correspond to at least a valid Pinyin spelling. The disambiguating method includes the following steps: clearing a node path to hold one or more node objects from the tree vocabulary database; initiating traversal of the vocabulary node tree at its root node; building a node path which consists of node objects that correspond to the input sequence; and building a list of valid spellings corresponding to the input sequence using the node path; then build a list of the Chinese phrases corresponding to the currently selected spelling.

This invention has numerous advantages. First, the method is easy for a native speaker to understand and learn to use because it is based on a phonetic, e.g. the official Pinyin, system. The user may ask for variants based on common confusion sets as described above based on user preferences. Second, the system tends to minimize the number of keystrokes required to enter text. Third, the system reduces the cognitive load on the user by reducing the amount of attention and decision-making required during the input process, and by the provision of appropriate feedback. Fourth, the approach disclosed herein tends to minimize the amount of memory and processing resources required to implement a practical system.

DETAILED DESCRIPTION OF THE INVENTION

System Construction and Basic Operation

Figure 1:
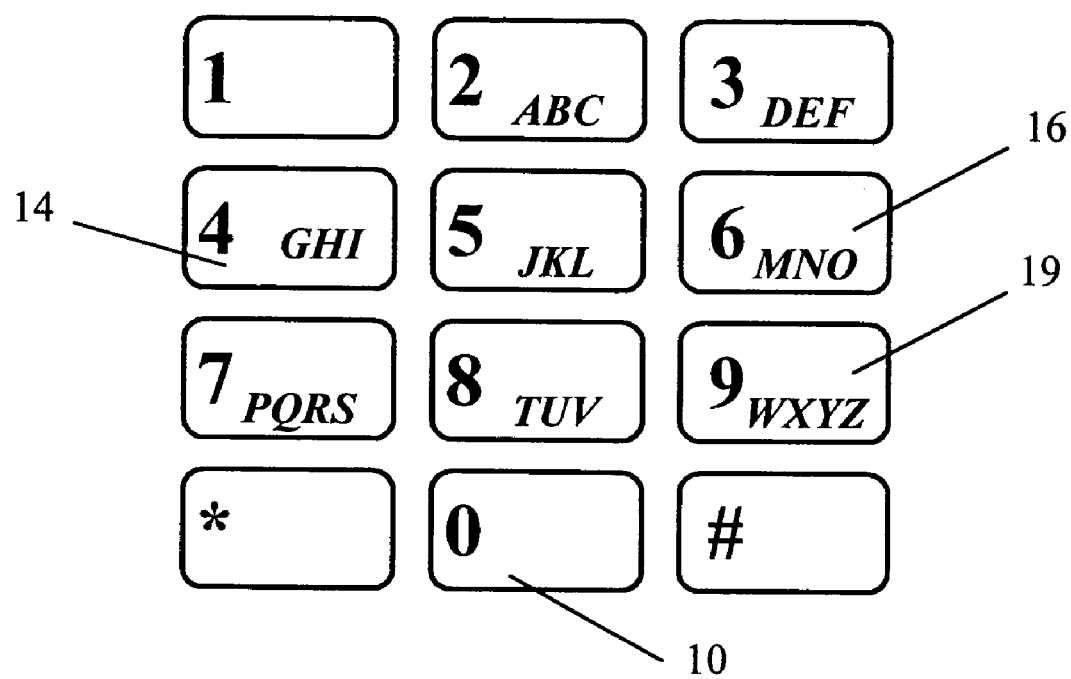
FIG. 1 is schematic diagram showing a keyboard layout for inputting Chinese characters using delimiters between Pinyin syllables according to prior art.
Figure 2:
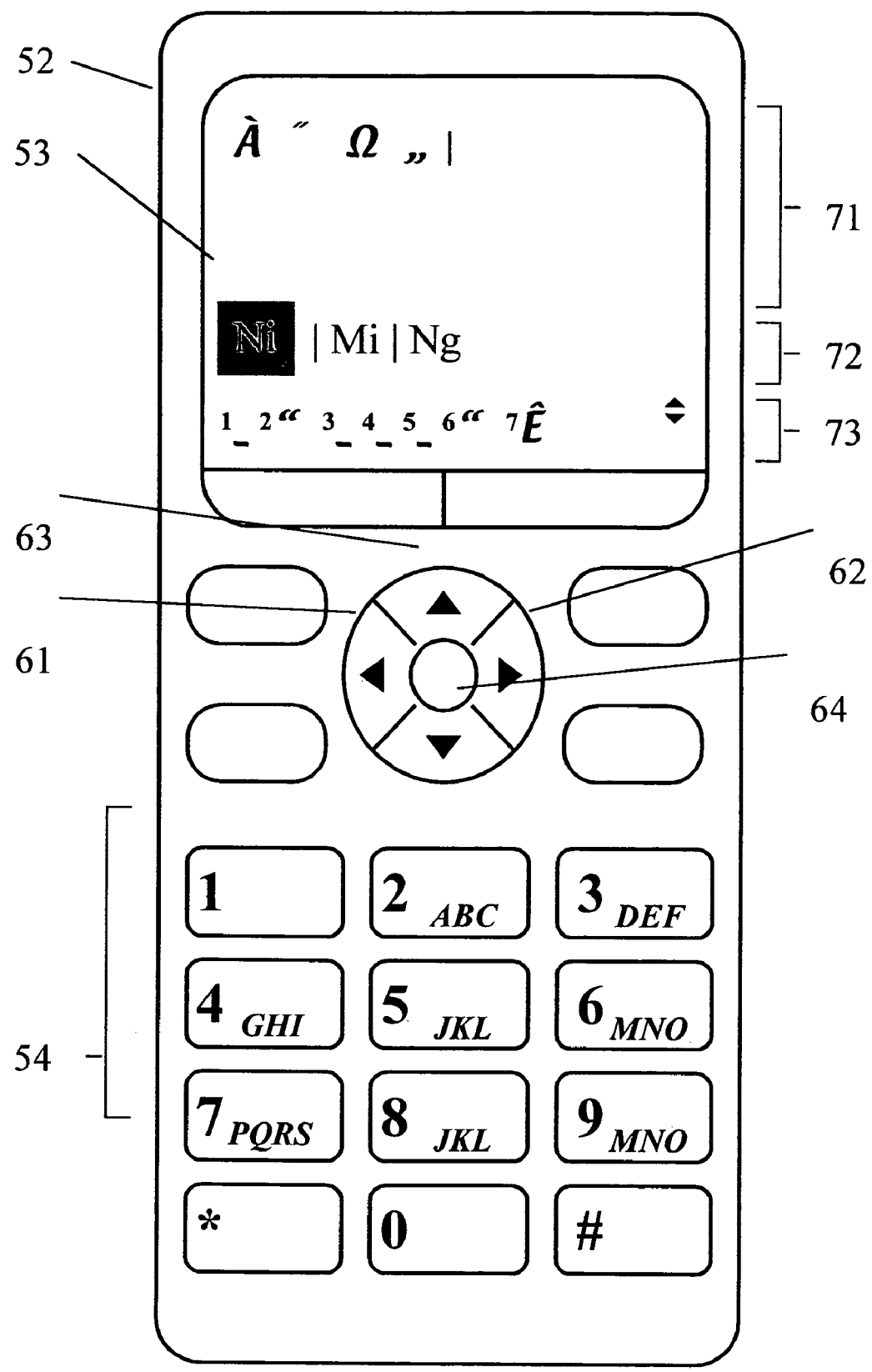
FIG. 2 is a schematic view of an exemplary embodiment of a cellular telephone which incorporates a reduced keyboard disambiguating system according to the invention.

With reference to FIG. 2, a reduced keyboard disambiguating system formed according to this invention is depicted as incorporated in a portable cellular telephone 52 having a display 53. The portable cellular telephone 52 contains a reduced keyboard 54 implemented on the standard telephone keys. For purposes of this application, the term "keyboard" is defined broadly to include any input device including a touch screen having defined areas for keys, discrete mechanical keys, membrane keys, and the like. The arrangement of the Latin alphabets on each key in the keyboard 54 is corresponding to what has become a de facto standard for American telephones. Note that keyboard 54 thus has a reduced number of data entry keys as compared to a standard QWERTY keyboard, where one key is assigned for each Latin alphabet. More specifically, the preferred keyboard shown in this embodiment contains ten data keys numbered '1' through '0' arranged in a 3-by-4 array, together with four navigation keys comprising of Left Arrow 61 and Right Arrow 62, Up Arrow 63 and Down Arrow 64.

The user enters data via keystrokes on the reduced keyboard 54. In the first preferred embodiment, when the user enters a keystroke sequence using the keyboard, text is displayed on the telephone display 53. Three regions are defined on the display 53 to display information to the user. A text region 71 displays the text entered by the user, serving as a buffer for text input and editing. A phonetic, e.g. Pinyin, spelling selection list 72, typically located below the text region 71, shows a list of Pinyin interpretations corresponding to the keystroke sequence entered by the user. A phrase selection list region 73, e.g. chinese phrases, typically located below the spelling selection list 72, shows a list of words corresponding to the selected Pinyin spelling, which is corresponding to the sequence entered by the user. The Pinyin selection list region 72 aids the user in resolving the ambiguity in the entered keystrokes by simultaneously showing both the most frequently occurring Pinyin interpretation of the input keystroke sequence and other less frequently occurring alternate Pinyin interpretations displayed in descending order of FUBLM. The Chinese phrase selection list region 73 aids the user in resolving the ambiguity in the selected Pinyin spelling by simultaneously showing both the most frequently occurring Phrase text of the selected spelling and other less frequently occurring Phrase text displayed in descending order of frequency of user base on a linguistic model (FUBLM). While Pinyin is described herein as comprising a phonetic input, it should be appreciated that phonetic inputs may comprise Latin alphabet; Bopomofo alphabet also known as Zhuyin; digits; and punctuation.

In order to present the user with possible phrases, the system relies on a linguistic model which can be limited to words found exactly in a database ordered alphabetically or according to total number of keystroke in ideographs, radicals of ideographs or a combination of both. The linguistic model can be extended to order linguistic objects according to a certain fixed frequency of common usage such as in formal or conversational, written or conversational spoken text. Additionally, the linguistic model can be extended to use N-gram data to order particular characters. The linguistic model can even be extended to use grammatical information and transition frequencies between grammatical entities to generate phrases which go beyond those phrases included in the database. Thus the linguistic model may be as simple as a fixed frequency of use and a fixed number of phrases, or include adaptive frequency of use, adaptive words or even involve grammatical/semantic models which can generate phrases which go beyond those contained in the database.

Figure 4:
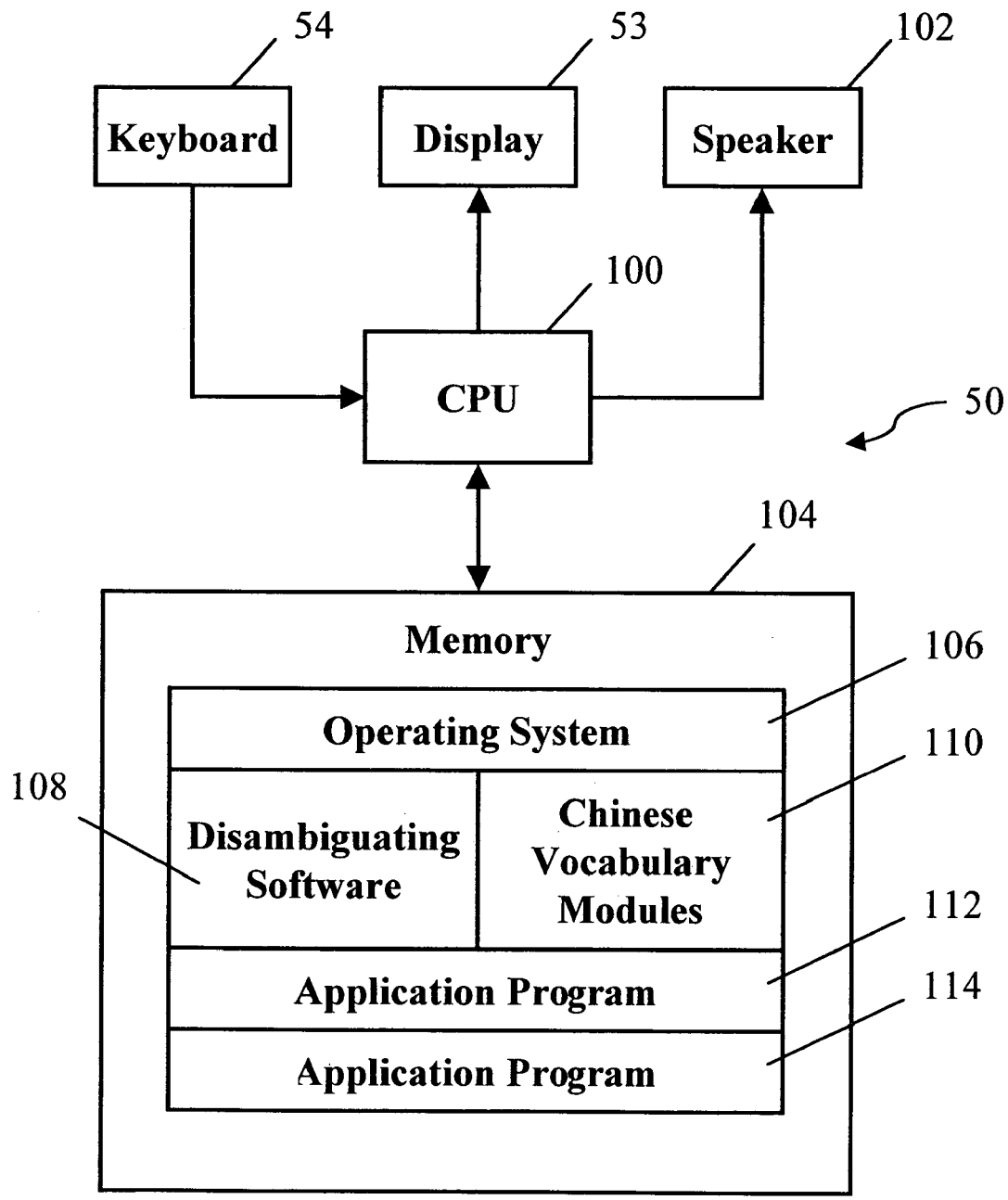
FIG. 4 is a block diagram illustrating the reduced keyboard disambiguating system of FIG. 2.

A block diagram of the reduced keyboard disambiguating system hardware is provided in FIG. 4. The keyboard 54 and the display 53 are coupled to a processor 100 through appropriate interfacing circuitry. Optionally, a speaker 102 is also coupled to the processor 100. The processor 100 receives input from the keyboard 54, and manages all output to the display 53 and speaker 102. Processor 100 is coupled to a memory 104. The memory 104 includes a combination of a temporary storage media, such as random access memory (RAM), and a permanent storage media, such as read-only memory (ROM), floppy disks, hard disks, or CD-ROMs. Memory 104 contains all software routines to govern system operation. Preferably, the memory 104 contains an operating system 106, disambiguating software 108, and associated vocabulary modules 110 which are discussed in additional detail below. Optionally, the memory 104 may contain one or more application programs 112, 114. Examples of application programs include word processors, software dictionaries, and foreign language translators. Speech synthesis software may also be provided as an application program which allows the reduced keyboard disambiguating system to function as a communication aid.

Referring back to FIG. 2, the reduced keyboard disambiguating system allows a user to quickly enter text or other data using only a single hand. The user enters data using the reduced keyboard 54. Each of the data keys 2 through 9 has multiple meanings, represented on the top of the key by Latin alphabets, numbers, and other symbols. Because individual keys have multiple meanings, keystroke sequences are ambiguous as to their meaning. When the user enters data, the various keystroke interpretations are therefore displayed in multiple regions on the display 53 to aid the user in resolving any ambiguity. On large-screen devices, a Pinyin selection list of possible interpretations of the entered keystrokes and a Chinese phrase selection list of the selected Pinyin spelling are displayed to the user in the selection list regions. The first entry in the Pinyin selection list is selected as a default interpretation and highlighted in any way to distinguish itself from the other Pinyin entries in the selection list. In the preferred embodiment, the selection Pinyin entry is displayed in reverse color image such as white font with a dark background.

The Pinyin selection list of the possible interpretations of the entered keystrokes may be ordered in a number of ways. In a normal mode of operation, the keystrokes are initially interpreted as a Pinyin spelling consisting of complete Pinyin syllables corresponding to a desired Chinese phrase (hereinafter as complete Pinyin interpretation). As keys are entered, a vocabulary module look-up is simultaneously performed to locate valid Pinyin spellings corresponding to the input key sequence. The Pinyin spellings are returned from the vocabulary module according to FUBLM, with the most commonly used Pinyin spelling listed first and selected by default. The Chinese phrases matching the selected Pinyin spelling are also returned from the vocabulary module according to FUBLM. Normally the user can find the Chinese phrase he wants to input in the Chinese phrase select list and then select the Chinese phrase and input the Chinese phrase in the text input region 71. If the default selected Pinyin spelling is what the user wants to input, but the Chinese phrase he wants to input is not displayed, he can use the Up Arrow 63 and Down Arrow 64 keys to display an extended set of other matched Chinese phrases from the vocabulary database. In a few cases, the Pinyin selection list region 72 cannot hold all matched Pinyin spellings, and thus the Left Arrow 61 and Right Arrow 62 keys are used to scroll the previously off-screen Pinyin spellings into the Pinyin select list region 72. For example, if the default selected Pinyin spelling is not what the user wants to input, he can use the Left Arrow 63 and Right Arrow 64 keys to select other matched Pinyin spellings.

In the majority of text entry, keystroke sequences are intended by the user to spell out complete Pinyin syllables. It is appreciated, however, that the multiple characters associated with each key allow the individual keystrokes and keystroke sequences to have several interpretations. In the preferred reduced keyboard disambiguating system, various different interpretations are automatically determined and displayed to the user as a list of Pinyin spellings and a list of Chinese phrases corresponding to the selected Pinyin spellings.

For example, the keystroke sequence is interpreted in the terms of partial Pinyin spelling corresponding to possible Chinese phrases that the user may be entering (thereinafter as partial Pinyin interpretation). Unlike complete Pinyin interpretation, partial Pinyin spelling allows the last Pinyin syllable to be incomplete. A Chinese phrase is returned from the vocabulary database if its Pinyin for the characters before the last character matches all syllables before the last partial Pinyin syllable while the Pinyin syllable of the last character starts with the partially completed syllable. By returning Chinese phrases that match a Pinyin spelling that extends the original partial phrasal Pinyin with a possible completion of the last Pinyin syllable, the partial Pinyin interpretation allows the user to easily confirm that the correct keystrokes have been entered, or to resume typing when his attention has been diverted in the middle of the phrase. The partial Pinyin interpretation is therefore provided as entries in the Pinyin spelling list. Preferably, the partial Pinyin interpretations are sorted according to the composite FUBLM of the set of all possible Chinese phrases that can match a Pinyin spelling that extends the partial Pinyin input with a possible completion of the last Pinyin syllable. Partial Pinyin interpretations provide feedback to the user by confirming that the correct keystrokes have been entered to lead to the entry of the desired word.

To reduce the number of possible matches displayed, the user may also input a syllable delimiter after a completed Pinyin syllable. In one preferred embodiment, the '0' key is used as a syllable delimiter. If syllable delimiters are entered, only Pinyin spellings whose syllable ending matches the position of syllable delimiters are returned and displayed in the Pinyin selection list region 72.

Figure 3:
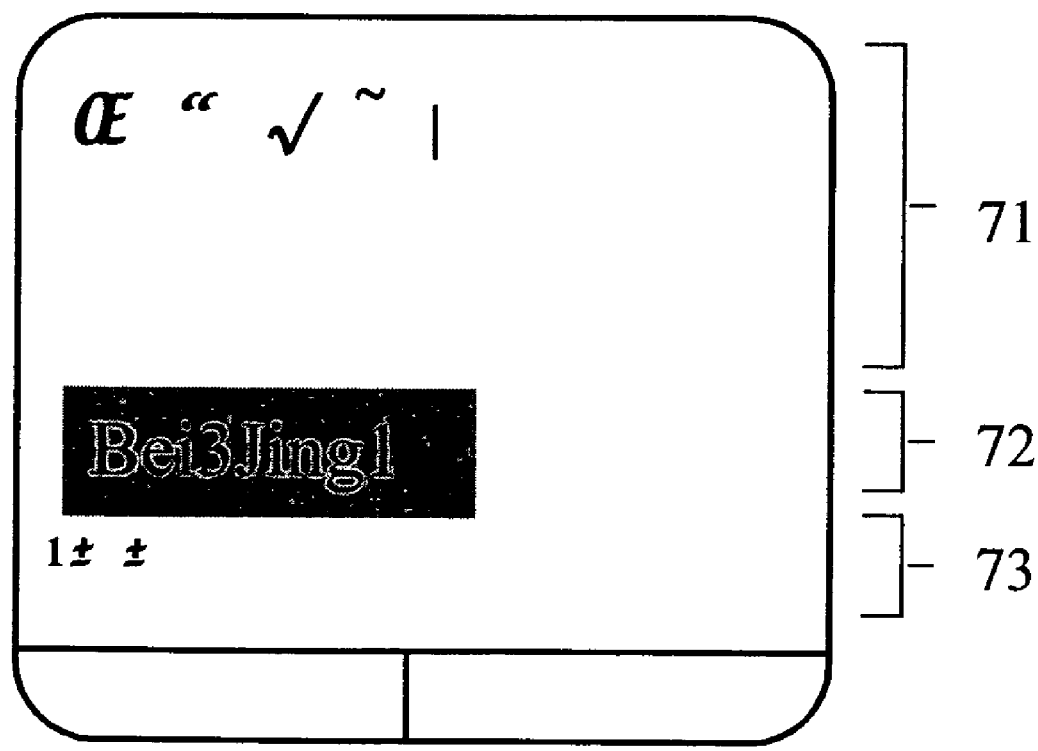
FIG. 3 is schematic diagram depicting an exemplary display where tones are used with Pinyin spelling during inputting Chinese phrases.

In another preferred embodiment, the user may also input a tone after each completed Pinyin syllable. After each completed Pinyin syllable, the user presses a tone key followed a number which corresponding to the tone of the syllable. In this preferred embodiment, the '1' key is used as the tone key. If tones are entered, only Pinyin spellings having Chinese phrases conversions that match the tones are returned and displayed in the Pinyin selection list region 72. The displayed Pinyin spellings also include the tones that have been entered. As shown in FIG. 3, the Pinyin spelling "Bei3Jing1" is shown in the Pinyin spelling list region 72. If a Pinyin spelling with tones has been selected, only Chinese phrases that match both the Pinyin spelling and the corresponding tones are returned and displayed. The filtering may be applied to tones following a complete Pinyin syllable or a partial Pinyin spelling.

Figure 11:
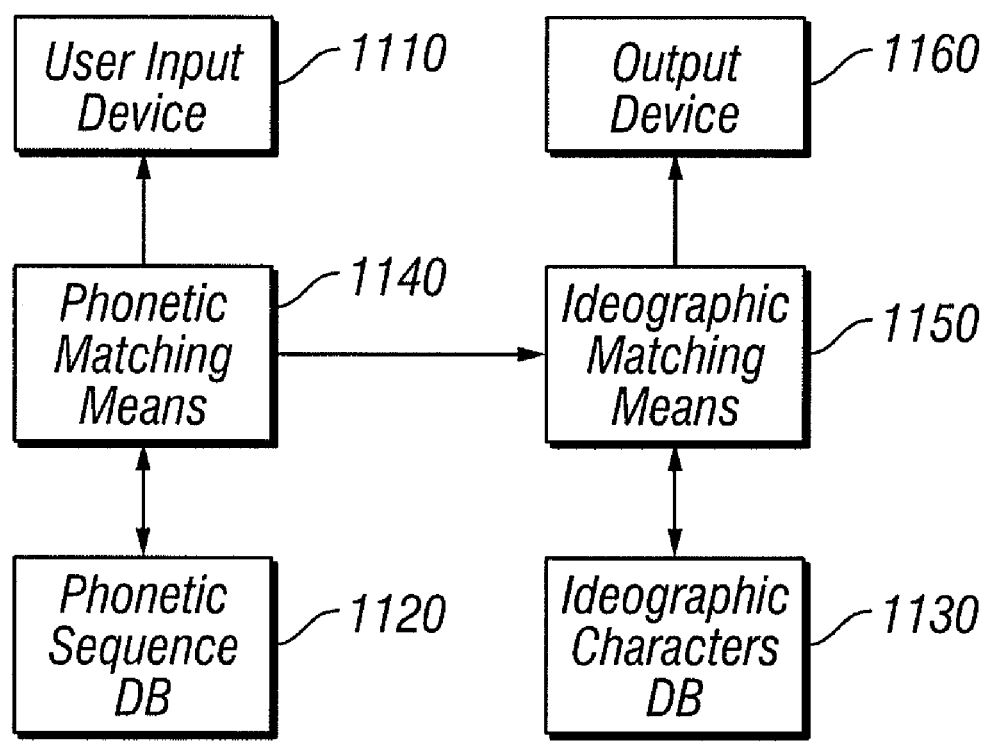
FIG. 11 is a block diagram illustrating a system for disambiguating ambiguous input sequences entered by a user and generating textual output in Chinese language according to one preferred embodiment of the invention.

The preferred embodiment described above is applicable to any other phonetic system other than the Pinyin system, such as the Zhuyin system which uses Bopomofo alphabets. FIG. 11 is a block diagram illustrating a system for disambiguating ambiguous input sequences entered by a user and generating textual output in Chinese language according to one preferred embodiment of the invention. The system includes the following:

a user input device 1110 having a plurality of input means, each of the input means being associated with a plurality of phonetic characters, an input sequence being generated each time when an input is selected by the user input device, the generated input sequence having a textual interpretation that is ambiguous due to the plurality of phonetic characters associated with the inputs;

a database 1120 containing a plurality of input sequences and, associated with each input sequence, a set of phonetic sequences whose spellings correspond to the input sequence;

a database 1130 containing a plurality of phonetic sequences and, associated with each phonetic sequence, a set of ideographic character sequences which correspond to the phonetic sequences;

means for comparing the input sequence with the phonetic sequence database and finding matching phonetic entries 1140;

means for matching the phonetic entries with the ideographic database 1150; and an output device 1160 for displaying one or more matched phonetic entries and matched ideographic characters.

To generate textual output, a user first generates an input sequence using the input means of the input device 1110. The system uses the comparing and matching means 1140 to find one or more phonetic sequences from the database 1120. One of the matching phonetic sequences, such as the one with highest FUBLM value, is selected by default or the user may select other ones from the matched list. The system then uses the matching means 1150 to find ideographic characters that matches the selected phonetic sequence. Both the matched phonetic sequences and the ideographic characters may be displayed on the output device 1160. One of the matched ideographic characters, such as the one with highest FUBLM value, is selected by default. The user may accept the default or select a different matched ideographic sequence or phonetic sequence.

Figure 12:
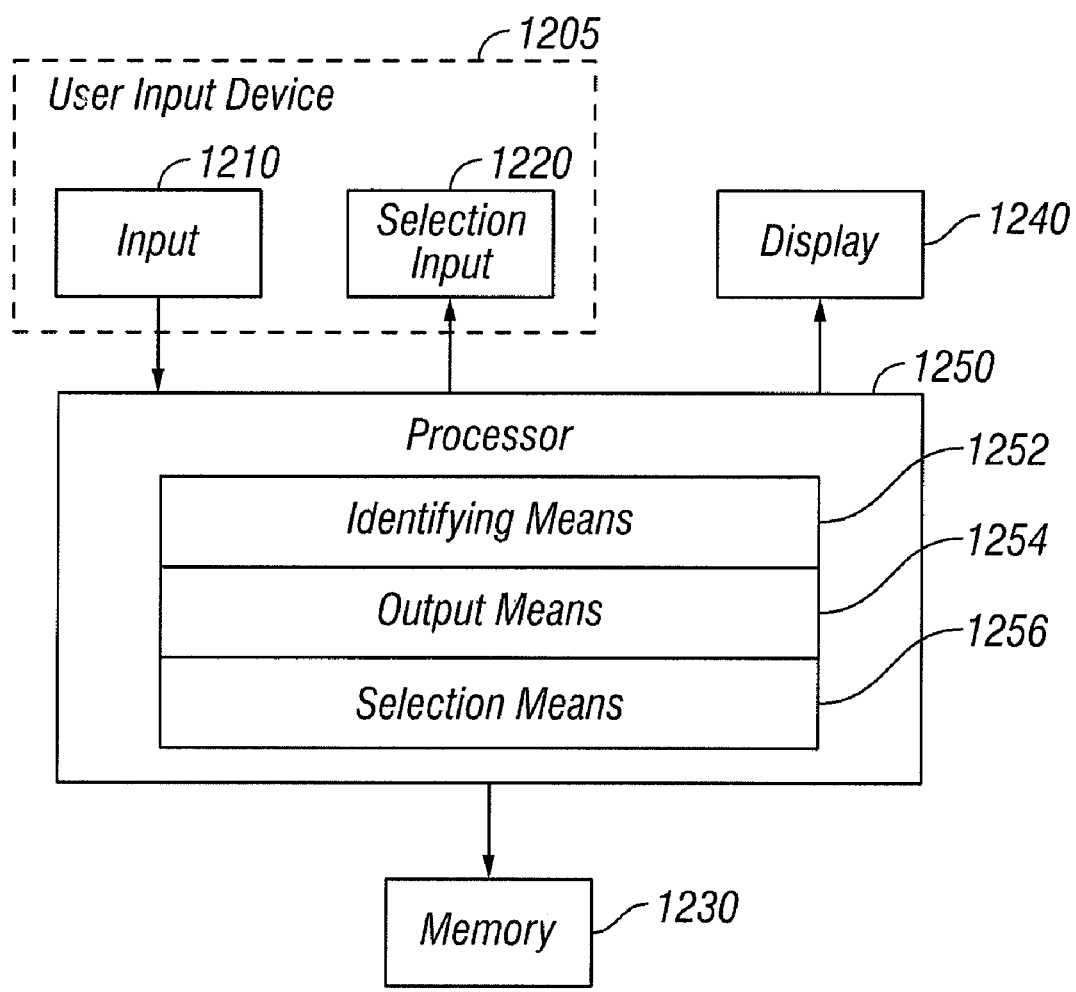
FIG. 12 is a block diagram illustrating an ideographic language text input system incorporated in a user input device according to one preferred embodiment of the invention.

FIG. 12 is a block diagram illustrating an ideographic language text input system incorporated in a user input device according to one preferred embodiment of the invention. The system includes the following:

a plurality of inputs 1210, each of the plurality of inputs associated with a plurality of characters, an input sequence being generated each time an input is selected by manipulating the user input device 1205, wherein a generated input sequence corresponds to a sequence of inputs that have been selected;

at least one selection input 1220 for generating an object output, wherein an input sequence is terminated when the user manipulates the user input device to a selection input;

a memory 1230 containing a plurality of objects, wherein each of the plurality of objects is associated with an input sequence;

a display 1240 to depict system output to the user; and a processor 1250 coupled to the user input device 1205, memory 1230, and display 1240.

The processor 1250 further includes: identifying means 1252 for identifying from the plurality of objects in the memory any object associated with each generated input sequence; output means 1254 for displaying on the display the character interpretation of any identified objects associated with each generated input sequence; and selection means 1256 for selecting the desired character for entry into a text entry display location upon detecting the manipulation of the user input device to a selection input.

Once the user manipulates the user input device 1205 and selects the inputs 1210, an input sequence is generated. The processor 1250 uses the identifying means 1252 to match one or more linguistic objects from memory 1230 with the generated input sequence. The character interpretation of the matched objects is output to the display 1240 by the processor

1250 using the output means 1254. The user then selects a character interpretation with the selection input 1220 and the processor 1250 invokes the selection means 1256 to output the selected character to a text entry display location.

Disambiguating Phonetic Input Method

The database of words and phrases that is used to disambiguate input sequences is stored in a vocabulary module using one or more tree data structures. Words corresponding to a particular keystroke sequence are constructed from data stored in a tree structure in the form of instructions which modify the set of words and word stems associated with the immediately preceding keystroke sequence. Thus, as each new keystroke in a sequence is processed, the set of instructions associated with that keystroke are used to create a new set of Pinyin spellings and Chinese phrases associated with the keystroke sequence which has the new keystroke appended to it. In this way, Pinyin spellings and Chinese phrases are not stored explicitly in the database. Instead, they are constructed based on the key sequence used to access them.

In the case of Chinese language, the tree data structure includes primary and secondary instructions. The primary instructions create the Pinyin spellings stored in a vocabulary module which consist of sequences of Latin alphabets corresponding to the Pinyin spellings of the Chinese phrases. The primary instructions include indicators specifying where the syllable boundaries are when creating the Pinyin spellings and whether the syllables have any conversions. Each Pinyin spelling is created by a primary instruction which modifies one of the Pinyin spelling associated with the immediately preceding keystroke sequence.

When a syllable has conversions, it has a list of secondary instructions which create the Chinese characters associated with the Pinyin syllable. The secondary instructions may also include the tones of each Chinese character. For Pinyin spellings with more than one syllable, each of the secondary instructions has a pointer that links back to the previous secondary instruction. Therefore, a Chinese phrase which has multiple syllables can be built from the last character to the first character.

Figure 5:
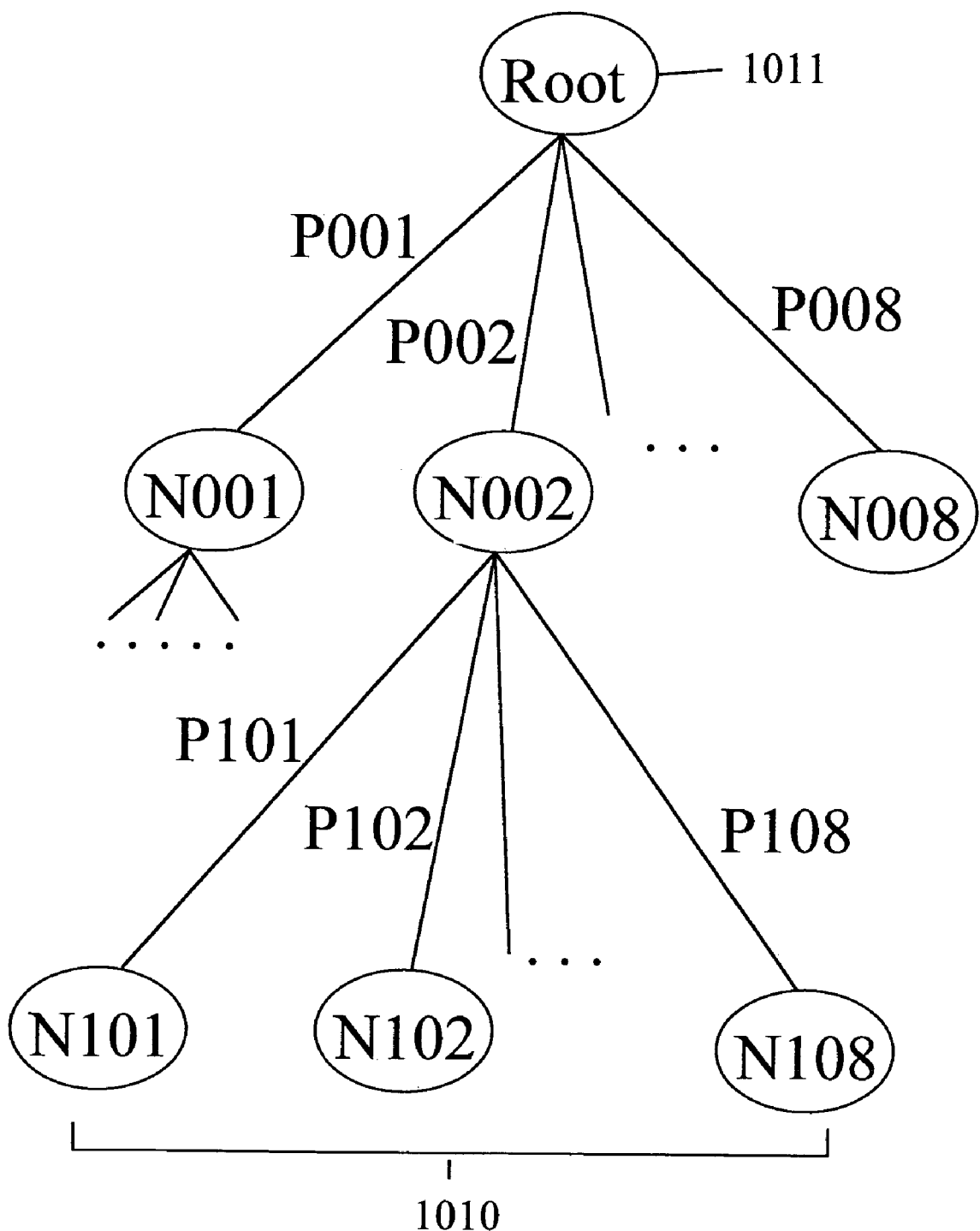
FIG. 5 is a schematic diagram depicting the preferred tree structure of a Chinese vocabulary module.

A representative diagram of a tree in a word object vocabulary module 1010 is depicted in FIG. 5. A tree data structure is used to organize the objects in a vocabulary module based on a corresponding keystroke sequence. As shown in FIG. 5, each node N001, N002, ..., and N008 in the vocabulary module tree represents a particular keystroke sequence. The nodes in the tree are connected by paths P001, P002, ..., P008. Since there are eight ambiguous data keys in the preferred embodiment of the disambiguating system, each parent node in the vocabulary module tree may be connected with eight children nodes. Nodes connected by paths indicate valid keystroke sequences, while the lack of a path from a node indicates an invalid keystroke sequence. An invalid keystroke sequence does not correspond to any Pinyin spelling which matches a stored Chinese phrase nor does it match to any partial Pinyin which can be extended to a complete Pinyin spelling which matches a stored Chinese phrase. Note that, in the case of an invalid input keystroke sequence, the system of the preferred embodiment would alert the user with a beep sound.

A vocabulary module tree is traversed based on a received keystroke sequence. For example, pressing the second data key from the root node 1011 causes data associated with the first key to be fetched from inside the root node 1011 and evaluated, then the path P002 to node N002 is traversed. Pressing the second data key a second time causes data associated with the second key to be fetched from node N002 and evaluated, then the path P102 to node N102 is traversed. Each node is associated with a number of objects corresponding to the keystroke sequence. As each keystroke is received and the corresponding node is processed, a node path is generated of the node objects corresponding to the keystroke sequence. The node path from each vocabulary module is used by the main routine of the disambiguating system to generate a Pinyin spelling list and a Chinese phrase list once a Pinyin spelling is selected.

Figure 6:
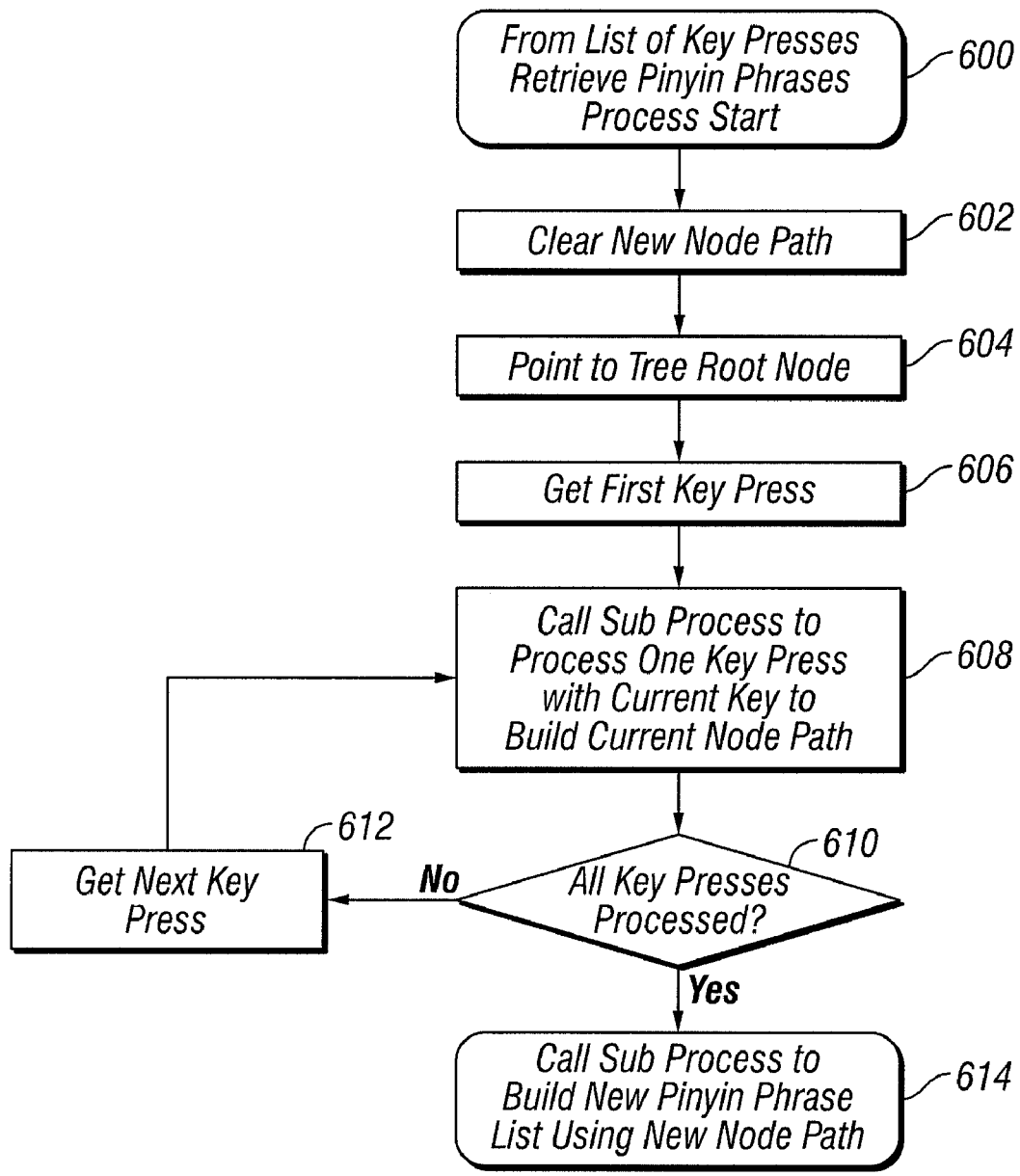
FIG. 6 is a flow diagram illustrating a preferred embodiment of a software process for retrieving Pinyin spellings from a vocabulary module given a list of key presses.

FIG. 6 is a flow diagram illustrating a process 600 for analyzing the received keystroke sequence to identify corresponding objects in a particular Chinese vocabulary module tree. The process 600 constructs a Pinyin spelling list for a particular keystroke sequence. Upon start, block 602 clears a new node path. Block 604 initiates the traversal of the tree of FIG. 5 at its root node 1011. Block 606 gets the first key press. Blocks 608 to 612 form a loop to process all available key presses. Block 608 calls sub process 620 in FIG. 7 to build a node path. Decision block 610 determines whether all available key presses have been processed. If any key presses remain unprocessed, block 612 advanced to the next available key press. If all key presses have been processed, block 614 calls sub process 700 to build Pinyin spellings list using the new node path that has been built.

Figure 7:
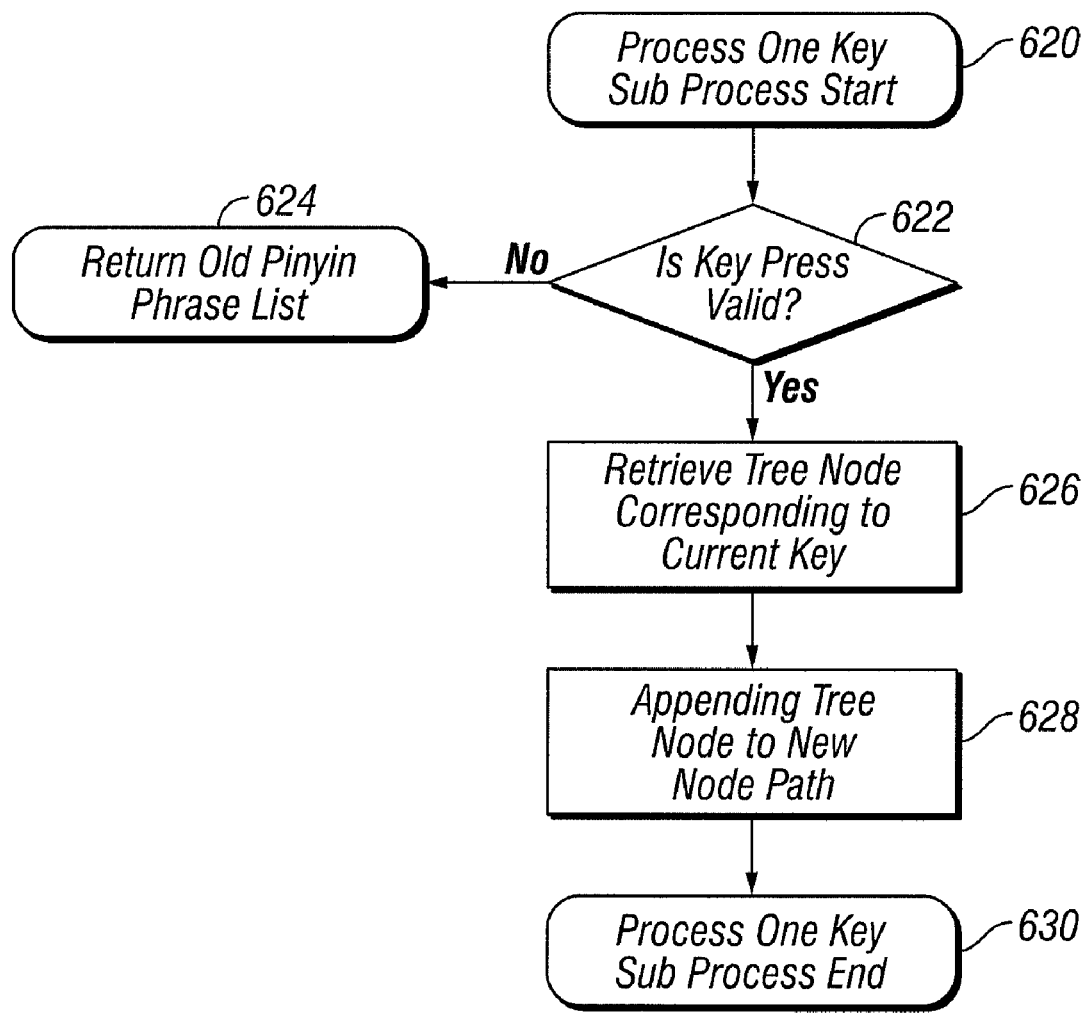
FIG. 7 is a flow diagram illustrating one embodiment of a software process for traversing the tree structure of the vocabulary module given a single key press.

FIG. 7 is a flow diagram illustrating a sub process 620 called from the process according to FIG. 6. The sub process 620 attempts to extend the new node path by one node. First, at decision block 622, a test is made to determine whether a key press is valid, i.e. whether there is a path that links the nodes corresponding to the keystrokes in the vocabulary module tree. If the key press is invalid, the system typically alerts the user that he has entered an invalid keystroke but the system may also provide the user with likely suggestions based on additional language models. If the received keystroke is determined to be valid at block 622, the sub process proceeds to block 626 to retrieve the tree node that corresponding to the current keystroke. Block 628 appends the retrieved tree node to the new node path. Block 630 ends the sub process 620.

Figure 8:
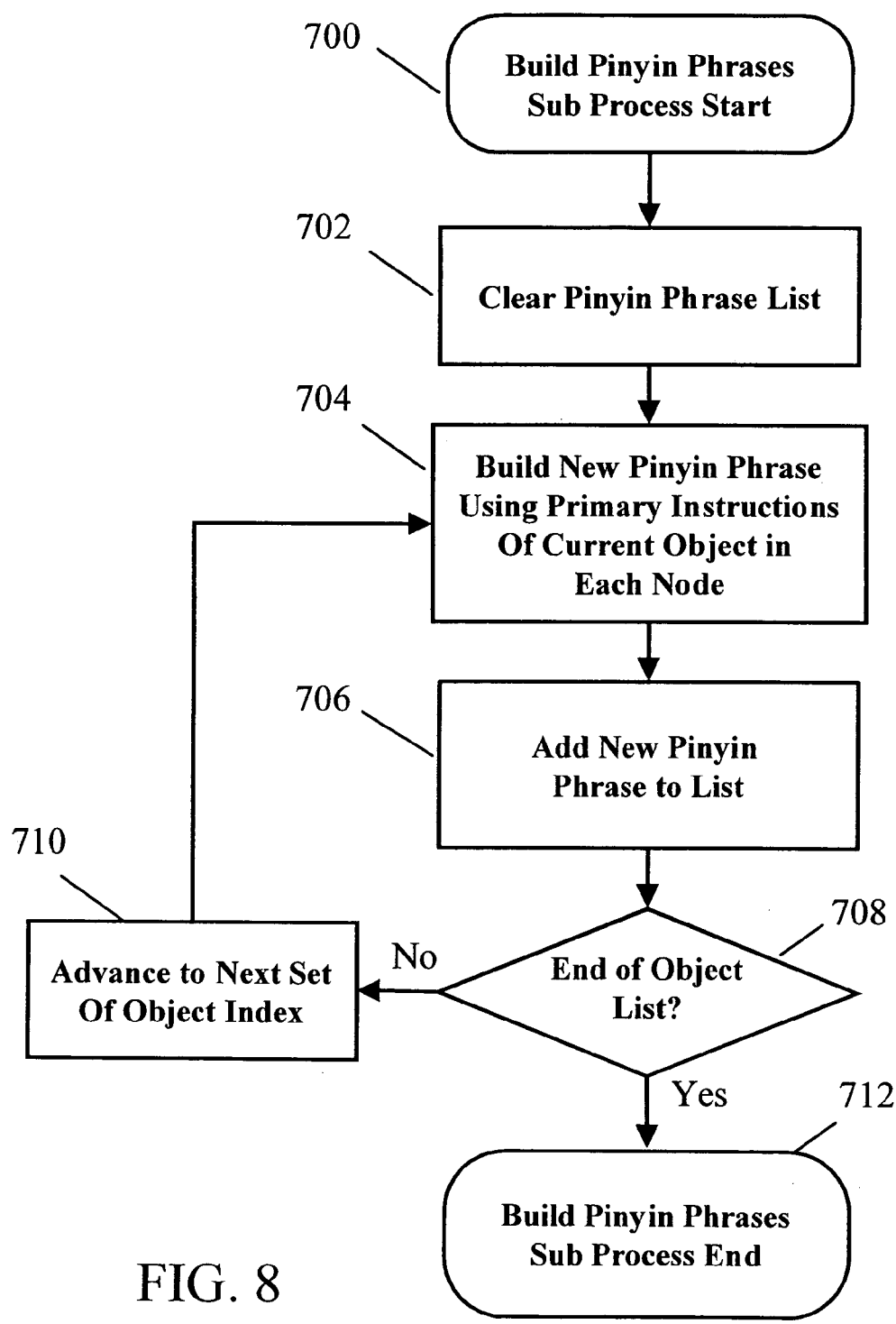
FIG. 8 is a flow diagram illustrating one embodiment of a software process for building Pinyin spellings for a node path that is previously built.

Once the node in the vocabulary module tree is located for the given key input, the disambiguating module scans and decodes the instruction lists in the node to build the valid Pinyin spellings. FIG. 8 is a flow diagram illustrating a sub process 700 called from the process according to FIG. 6. The sub process 700 attempts to build the Pinyin spelling list from the new node path built by the sub process 620 according to FIG. 7 after all keystrokes have been successfully processed. Block 702 clears the new Pinyin spelling list. Blocks 704 to 710 form a loop to add all Pinyin spellings that matches the new node path. Block 704 uses the primary instructions of current objects in each node in the node path to build a Pinyin spelling. Block 706 adds the Pinyin spelling to the new Pinyin spelling list. Decision block 708 determines whether all objects in all nodes in the node path have been processed. If any objects remain unprocessed, block 710 advanced to the next set of object indexes. If all objects of all nodes in the node path have been processed, block 712 ends the sub process 700 and return the new Pinyin spellings list.

Because the primary instructs include indicators of Pinyin syllable boundaries, the Pinyin spellings built from input sequence are automatically parsed into individual syllables without the need to input delimiters between Pinyin syllables. The Pinyin spellings returning to the user have indicators to identify individual Pinyin syllables contained in the Pinyin spelling. In one preferred embodiment, the format of the spellings returned or expected is: (1) each syllable begins with the upper case letter; (2) if a tone is entered for a syllable, the syllable is followed by a numeric digit (1-5).

For instance, the Pinyin spelling consists of two syllables "bei" and "jing" are returned as "BeiJing" if no tone is entered. If tone is only entered for "bei", then "Bei3Jing" is returned. If tones are entered for both syllables, then "Bei3Jing1" is returned.

The Pinyin spelling list returned from process 600 according to FIG. 6 is displayed in the Pinyin spelling list region 72 as shown in FIG. 2 and FIG. 3. The valid spellings are ranked by the FUBLM in the vocabulary module tree. The first one with the highest rank of FUBLM is retrieved first. It is also the default Pinyin spelling selection.

Once a Pinyin spelling is selected either by default or is chosen by the user with the navigation keys Left Arrow 61 and Right Arrow 62, the corresponding Chinese phrases are built and returned.

Figure 9:
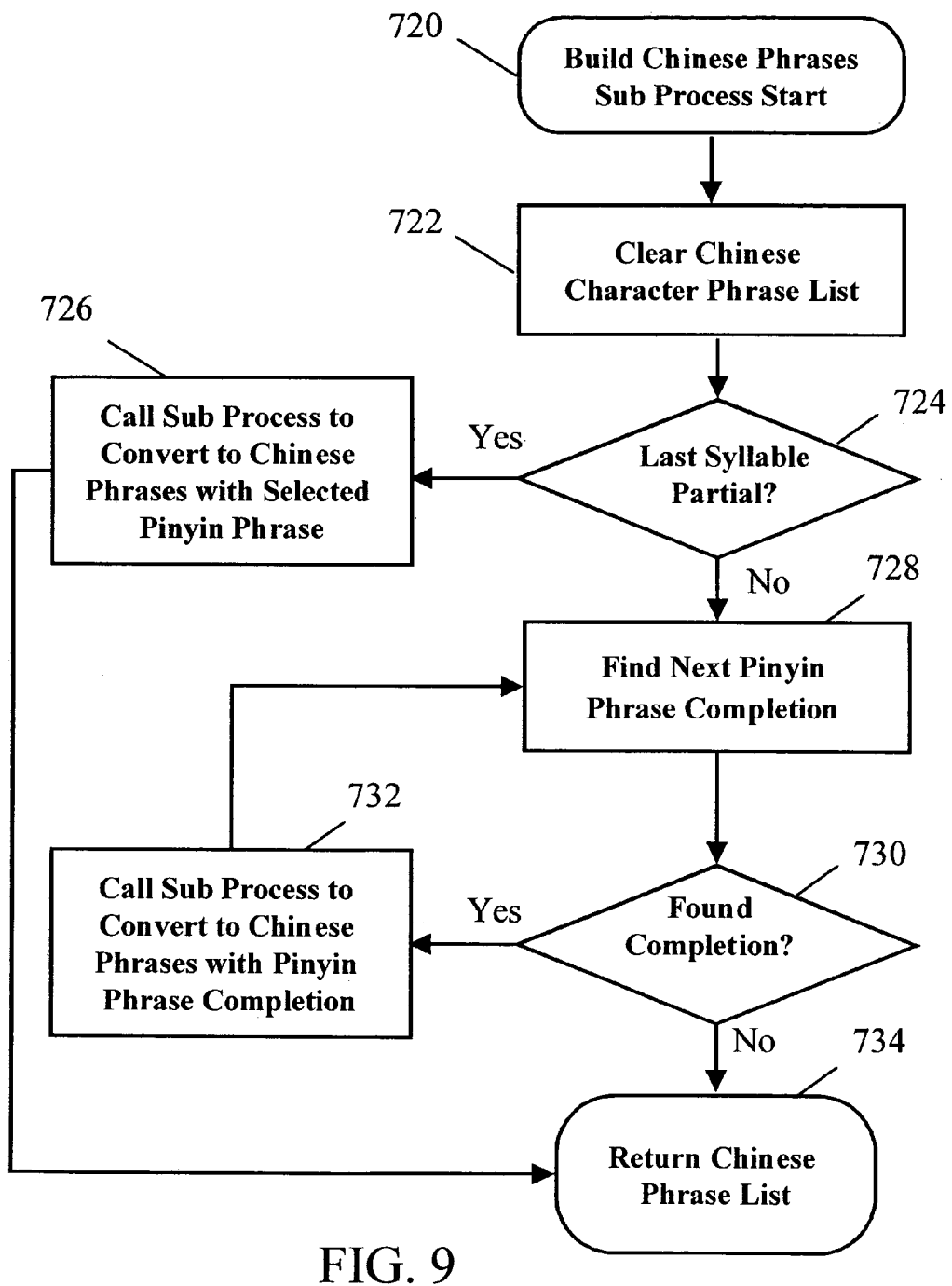
FIG. 9 is a flow diagram illustrating one embodiment of a software process for building Chinese phrases list for a selected Pinyin spelling.

FIG. 9 is a flow diagram illustrating a sub process 720 for building Chinese phrases corresponding to a Pinyin spelling in a particular Chinese vocabulary module tree. The sub process 720 constructs a Chinese phrase list for a Pinyin spelling which is built from a node path. Block 722 clears a Chinese phrase list. The decision block 724 checks whether the last syllable of the selected Pinyin spelling is partial. If the syllable of the selected Pinyin spelling is not partial, block 726 calls convert sub process 740 shown in FIG. 10 to convert current Pinyin spelling to Chinese phrases and add Chinese phrases to the Chinese phrase list. Block 734 returns the Chinese phrase list.

Now the new node path from which the selected Pinyin spelling has been built is still stored in memory. This section of node path is created based on the key sequence. The nodes within this section of the path match the key sequence. The valid spellings are built only from this section of the path. The exactly matched words are also constructed only from this section of the path as well.

If the last syllable of the selected Pinyin spelling is partial, blocks 728 to 732 form a loop to process all possible completions of the last syllable. Block 728 finds the next Pinyin completion that has a matching Chinese phrase in the vocabulary module tree. The new node path is extended by a second section of the path to look ahead and search the partially matched words to support the partial Pinyin completion. If the last syllable is partial (that is, it is not a complete syllable), the disambiguating module searches the vocabulary module tree to find the words whose spellings partially match the key sequence, and then present them in the Chinese phrase list following the exactly matched words. The partial Pinyin completion looks ahead until the last syllable is complete. There are maximum five nodes in the second section of the path because the longest syllable is "Chuang" or "Shuang" or Zhuang". Only in these three cases, the process looks ahead five more nodes.

For instance, if the key input is "2345", one of the valid spellings is "BeiJ". The first complete syllable is "Bei". The second is "J" that is not a complete syllable. Thus, the first section of the path for this case is to build the spelling "BeiJ". The process will look ahead in the vocabulary module tree to complete the last syllable. Then, it finds the word (BeiJing) that has partial spelling matches "BeiJ". The second section of the path is used to build "ing". If the word "BeiJingShi" is also in the vocabulary module tree, the process would not locate this word for the key input "2345" because it requires looking ahead two more syllables.

Decision block 730 determines whether next Pinyin spelling completion is found. If next Pinyin spelling completion is found, block 732 calls sub process 740 in FIG. 10 to convert current Pinyin spelling completion to Chinese phrases and add Chinese phrases to the Chinese phrase list. If no more Pinyin spelling completion is found, block 734 returns the Chinese phrase list.

Figure 10:
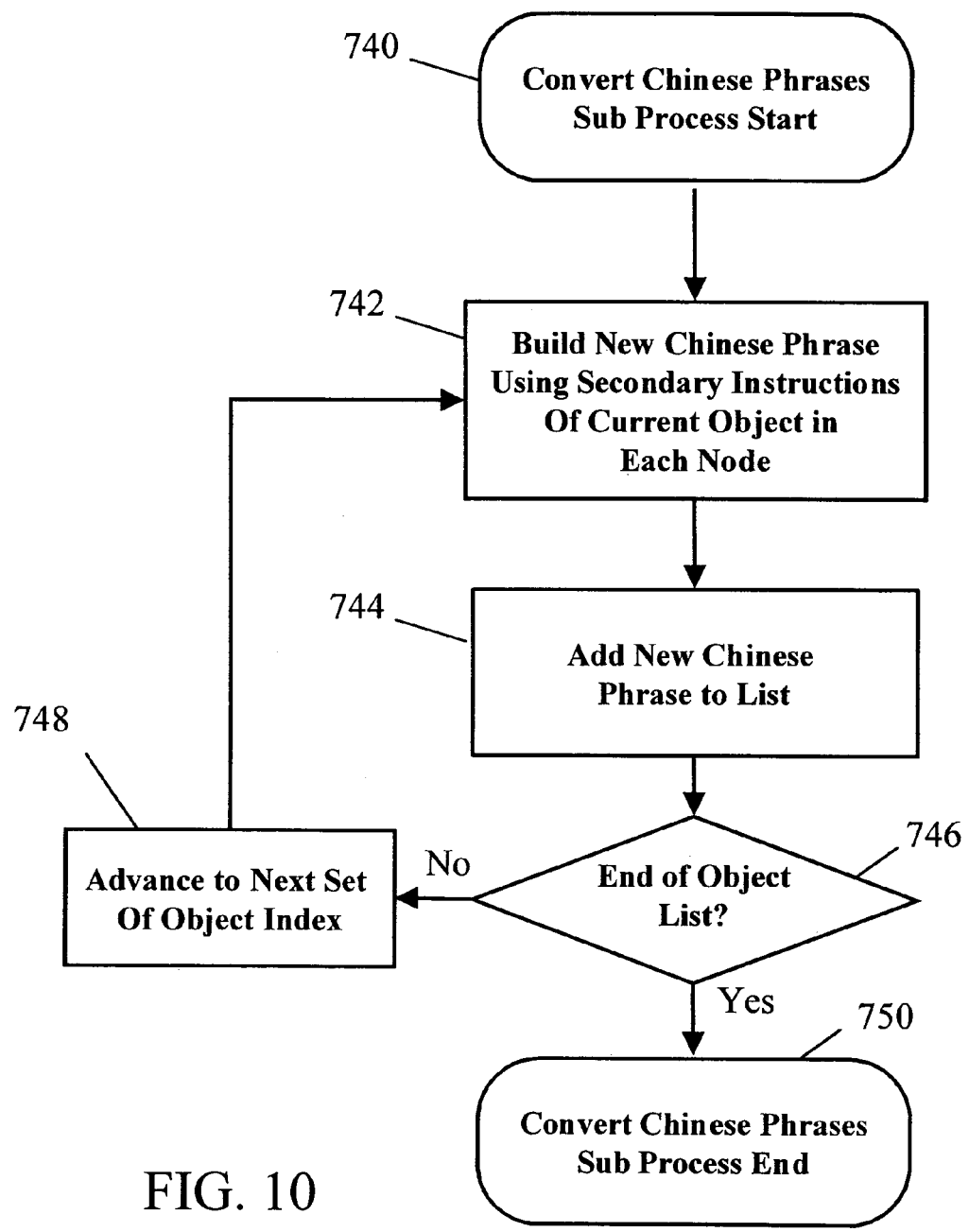
FIG. 10 is a flow diagram illustrating one embodiment of a software process for converting a Pinyin spelling to its corresponding Chinese phrases list.

FIG. 10 illustrates the sub process 740 called from process 620 according to FIG. 7. The sub process 740 attempts to build the Chinese phrases list for a given Pinyin spelling from the new node path built by sub process 620, which may be extended by a second section to complete the last syllable. Blocks 742 to 748 form a loop to add all Chinese phrases that matches the new node path with an optional extension section. Block 742 uses the secondary instructions of current objects in each node in the node path to build a Chinese phrase. Block 744 adds the Chinese phrase to the Chinese phrase list. The decision block 746 determines whether all objects in all nodes in the node path have been processed. If any objects remain unprocessed, block 748 advanced to the next set of object indexes. If all objects of all nodes in the node path have been processed, block 750 ends sub process 740 and returns the Chinese phrases list.

If any tone is entered, the process can filter the characters because the character tones are retrieved along with their Unicodes when secondary instructions are executed. If a character has more than one pronunciation, the most common one is retrieved first.

The conversions (characters and words) for each spelling are prioritized by the FUBLM. The most frequently used character or word is retrieved first during the spelling-character/word conversion. The words converted from the exactly matched spelling are ordered ahead of the words converted from the partial matched spellings. The words converted from the different partial matched spellings are sorted by the key order (that is, key 2, 3, 4, 5 . . . ) and the frequency order of the letters on the key (character on the key index).

For instance, assume the active spelling is "Sha". Since 'n' is ordered ahead of 'o' when the previous letter is 'a', the characters converted from the "Sha" are returned first, followed by the ones converted from "Shai", "Shan", "Shang" and "Shao".

Figure 13:
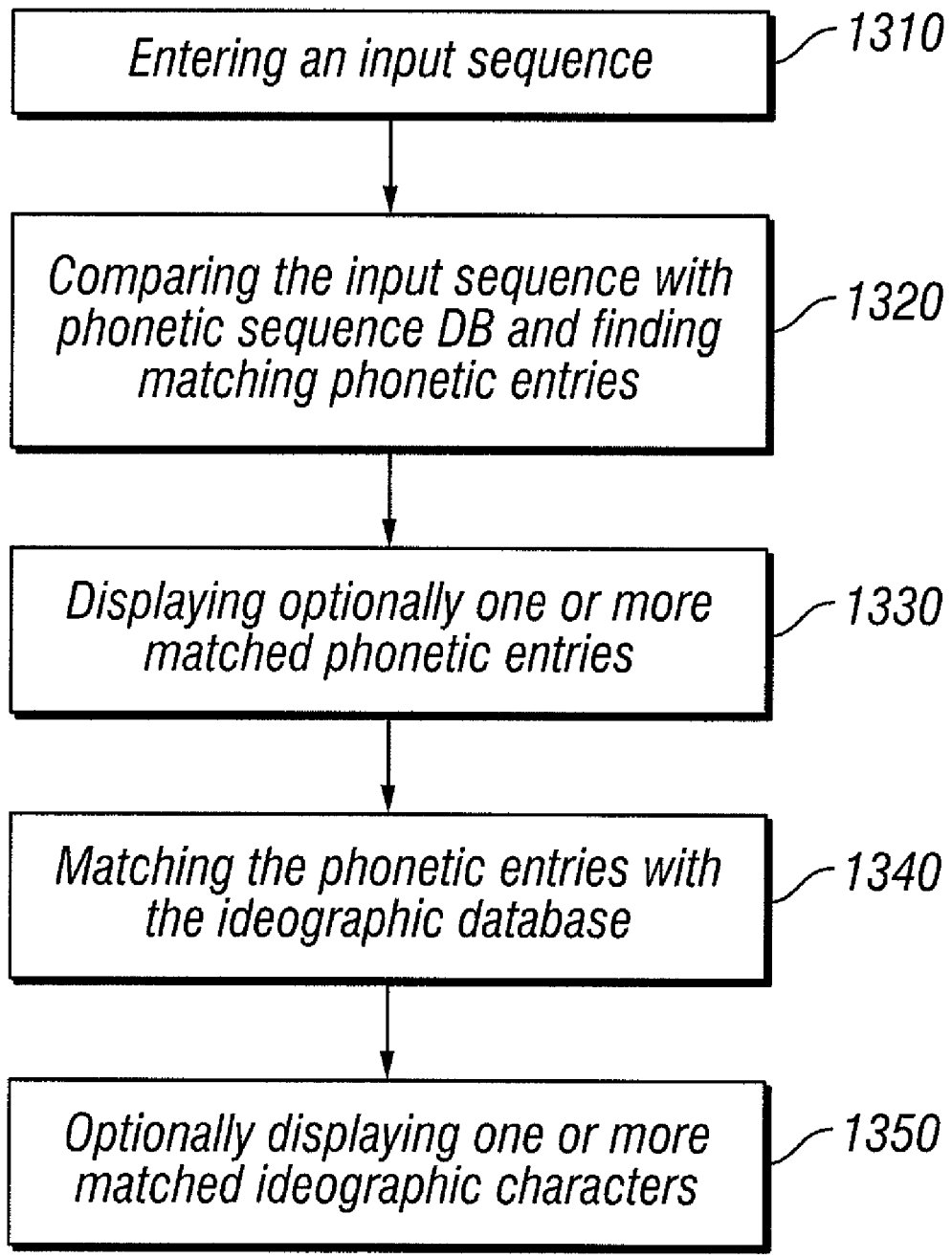
FIG. 13 is a flow diagram illustrating a method for disambiguating ambiguous input sequences entered by a user and generating textual output in Chinese language according to one preferred embodiment of the invention.

The disambiguating method described above is applicable to any other phonetic system other than the Pinyin system, such as the Zhuyin system which uses Bopomofo alphabets. FIG. 13 is a flow diagram illustrating a method for disambiguating ambiguous input sequences entered by a user and generating textual output in Chinese language according to one preferred embodiment of the invention. The method includes the steps of:

Step 1310: entering an input sequence into a user input device;

Step 1320: comparing the input sequence with the phonetic sequence database and finding matching phonetic entries;

Step 1330: displaying optionally one or more matched phonetic entries;

Step 1340: matching the phonetic entries with the ideographic database; and

Step 1350: optionally displaying one or more matched ideographic characters.

In another preferred embodiment, the disambiguating Pinyin system allows spelling variations which are typically caused by regional accents. Regional accents can lead to variations in pronunciations for various syllables. This can lead to confusion about for instance "zh-" and z-", "-n" and "-ng". To accommodate these variations, variations on certain spellings can be considered. Variations can either be displayed as part of the selection list for the particular Pinyin, for instance if the user types "zan" the selection list may include "zhan" and "zhang" as possible variants, or the user when failing to find a particular character may select a "show variants" options which will provide the user with possible variations of the spelling. Additionally the user may be able to turn off and on particular "confusion sets" such as "z<->zh", "an<->ang" etc.

TABLE 5

Examples of Common Confusion Sets

| | |
|---|---|
| A | Ia |
| E | IE |
| O | Ou, uo |
| An | Ang, ian, iang |
| En | Eng |
| In | Ing |
| Ong | Iong |
| Uan | Uang |
| On | Ong, iong |
| Ao | Iao |
| Z | Zh |
| C | Ch |
| S | Sh |
| L | N |

In another preferred embodiment, the disambiguating system includes a custom word dictionary. Since the dictionary of phrases is limited by the available memory, the custom word dictionary is essential that the user can add Pinyin/character combinations manually which can then be accessed via the input method.

In another preferred embodiment, the disambiguating Pinyin system may update the FUBLM adaptively based on the recency of use. The initial phrases are ordered according to a particular linguistic model (for instance the frequency of use in a corpus) which may not match the user's expectations. By tracking the user's patterns, the system will learn and update the linguistic model accordingly.

In another preferred embodiment, the system may provide the user with word predictions based on the words syllables entered so far and a linguistic model. The linguistic model may be used to determine in which order the predictions should be presented to the user. In fact the linguistic model can provide the user with predictions of words even before the user types any characters. Such a linguistic model may be based on simple frequency of use of single characters, or frequency of use of two or more character combinations (N-grams) or a grammatical model or even a semantic model. In alternative embodiments, the number of total keystrokes in an ideograph; radical of an ideograph; radical and number of strokes of a radical; alphabetically ordered; frequency of occurrence of ideograph sequences or phonetic sequences in formal, conversational written, or conversational spoken text; frequency of occurrence of ideographic sequences or phonetic sequences when following a preceding character or characters; proper or common grammar of the surrounding sentence; application context of current input sequence entry; and recency of use or repeated use of phonetic or ideographic sequences by the user or within an application program.

While the preferred input method would require the user to enter the full spelling of the word, the user may select to enter only the first character of each syllable. Thus instead of typing BeiJing, the user type BJ and is provided with phrases that match this acronym. Additionally the user may define their own acronyms and add them to the Custom word dictionary.

In addition to a single tree which combines Pinyin and phrases, another implementation can be envisioned in which there are two separate trees, one tree which maps key presses to valid single syllable Pinyin and another tree which contains Pinyin words and their ideographic representation. The second tree is easier to edit thus inserts and deletions can be made in the tree, allowing for 'on the fly' reordering of the order in which phrases and conversions are presented. In addition it allows the user to add phrases to the existing tree or to a parallel tree structure which contains the custom word dictionary data described above.

In addition to ambiguous entry of characters, the system may also provide a non-ambiguous method for the user to explicitly select a character.

During the input process, the user may enter partial syllables for each of the multiple syllable words. Preferably, the number of partial keystrokes for each syllable is one, for example, the first keystroke of each syllable.

The system may also display after the valid final sounds the user identifies the initial sound. For example, if a user is trying to input Pinyin syllable "Zhang", the user first identifies the initial sound "zh" and then is provided with valid final sounds for the initial for which the user may select "ang".

During the input process, the user may also select one of the plurality of inputs which is associated with a special wildcard input. The special wildcard input may match zero or one of phonetic characters.

The system may also display phonetic sequences include matching entries in English or other alphabetic languages and allow simultaneous interpretation of the key presses as syllables and words in a secondary language such as English.

As is shown by the above detailed description, a system has been designed to create an effective reduced keyboard input system for Chinese language. First, the method is easy for a native speaker to understand and learn to use because it is based on the official Pinyin system. Second, the system tends to minimize the number of keystrokes required to enter text. Third, the system reduces the cognitive load on the user by reducing the amount of attention and decision-making required during the input process and by the provision of appropriate feedback. Fourth, the approach disclosed herein tends to minimize the amount of memory and processing resources required to implement a practical system.

Those skilled in the art will also recognize that minor changes can be made to the design of the keyboard arrangement and the underlying database design, without significantly departing from the underlying principles of the current invention.

Accordingly, the invention should only be limited by the Claims included below.

The invention claimed is:

1. A method for disambiguating ambiguous input sequences entered by a user and generating textual output in Chinese language, said method comprising the steps of:
    entering an input sequence into a user input device;
    wherein said user input device comprises a plurality of input means, each of said input means being associated with a plurality of phonetic characters, an input sequence being generated each time when an input is selected by said user input device, said generated input sequence having a textual interpretation that is ambiguous due to the plurality of phonetic characters associated with said inputs, data consisting of a plurality of input sequences and, associated with each input sequence, a set of phonetic sequences whose spellings correspond to the input sequence, and a database containing a plurality of phonetic sequences and, associated with each phonetic sequence, a set of ideographic character sequences which correspond to the phonetic sequences;
    comparing the input sequence with said phonetic sequence database and finding matching phonetic entries;

optionally displaying one or more matched phonetic entries;

matching said phonetic entries with said ideographic database; and optionally displaying one or more matched ideographic characters.

2. The method of claim 1, further comprising the step of:
prioritizing phonetic sequences that match an input sequence and prioritizing ideographic sequences that match a phonetic sequence according to a linguistic model.

3. The method of claim 2, wherein said linguistic model comprises at least one of:
number of total keystrokes in an ideograph;
radical of an ideograph;
radical and number of strokes of a radical;
alphabetically ordered;
frequency of occurrence of ideographic sequences or phonetic sequences in formal, conversational written, or conversational spoken text;
frequency of occurrence of ideographic sequences or phonetic sequences when following a preceding character or characters;
proper or common grammar of the surrounding sentence;
application context of current input sequence entry; and
recency of use or repeated use of phonetic or ideographic sequences by the user or within an application program.

4. The method of claim 2, further comprising the step of:
once an ideographic character sequence is selected, changing the associated priority of said matching phonetic sequence and sequence of ideographic characters.

5. The method of claim 1, wherein said set of phonetic characters comprises at least one of following:
Latin alphabet;
Bopomofo alphabet also known as Zhuyin;
digits; and
punctuation.

6. The method of claim 1, wherein said phonetic sequences comprise single syllables.

7. The method of claim 1, wherein said phonetic sequences comprise single and multi-syllables.

8. The method of claim 1, wherein said phonetic sequences comprise user generated sequences.

9. The method of claim 1, wherein said phonetic syllables and said corresponding ideographic characters are stored in at least one data structure.

10. The method of claim 9, wherein the data structures are ordered by grammatical categories.

11. The method of claim 1, wherein all monosyllabic phonetic syllables are stored in a single data structure and said corresponding phonetic syllables that form a word or phrase and one or more ideographic characters that match said word or phrase are stored in at least one data structure.

12. The method of claim 1, wherein an object is added to the database if an object does not exist for an input sequence.

13. The method of claim 12, wherein in absence of matching phonetic sequences in said database, a sequence of matching phonetic sequences is automatically generated based on single and optionally multi-syllable phonetic sequences.

14. The method of claim 13, wherein said sequence of matching phonetic sequences is narrowed down through user interaction.

15. The method of claim 13, wherein a sequence of matching ideographic sequences is automatically generated based on matching phonetic sequences to ideographic sequences.

16. The method of claim 15, wherein a sequence of matching ideographic sequences is narrowed down through user interaction.

17. The method of claim 16, wherein once a selection has been made, said matching input sequence, said matching phonetic sequence and said matching ideographic sequence are added to a data structure.

18. The method of claim 12, wherein a desired phonetic sequence and corresponding ideographic character sequence are specified through a second input mechanism.

19. The method of claim 1, wherein the user can specify a particular tone for the phonetic syllable.

20. The method of claim 19, wherein one of the plurality of inputs is associated with a special wildcard input that is associated with any or all tones.

21. The method of claim 1, wherein the user can specify an explicit syllable separator.

22. The method of claim 1, further comprising the step of:
when the user enters a sequence of phonetic characters, returning a sequence of phonetic sequences of exact matches and predictions that partially match.

23. The method of claim 22, wherein said sequence of phonetic sequences is ordered according to a linguistic model.

24. The method of claim 23, wherein said linguistic model comprises at least one of:
number of total keystrokes in an ideograph;
radical of an ideograph;
radical and number of strokes of radical;
alphabetically ordered;
frequency of occurrence of phonetic sequences or ideographic sequences in formal or conversational written text;
frequency of occurrence of phonetic sequences or ideographic when following a preceding character or characters;
proper or common grammar of the surrounding sentence;
application context of current character sequence entry; and
recency of use or repeated use of phonetic sequences by the user or within an application program.

25. The method of claim 1, further comprising the step of:
once the user has selected a sequence of ideographic characters, presenting the user with a list of sequences of one or more ideographic characters.

26. The method of claim 25, wherein said list of sequences is ordered according to a linguistic model.

27. The method of claim 26, wherein said linguistic model comprises at least one of:
number of total keystrokes in an ideograph;
radical of an ideograph;
radical and number of strokes of radical;
alphabetically ordered;
frequency of occurrence of ideographic characters in formal or conversational written text;
frequency of occurrence of ideographic characters when following a preceding character or characters;
proper or common grammar of the surrounding sentence;
application context of current character entry; and
recency of use or repeated use of ideographic characters by the user or within an application program.

28. The method of claim 1, wherein the matches between said input sequence and said phonetic sequences are part of confusion sets.

29. The method of claim 28, wherein the user can select which confusion sets are active.

30. The method of claim 28, wherein one of the plurality of inputs is associated with providing alternative phonetic sequence interpretations of the input sequence based on confusion sets or misspellings.

31. The method of claim 28, wherein one of the plurality of inputs is associated with providing alternative ideographic interpretations of an input sequence, based on confusion sets or misspellings.

32. The method of claim 28, wherein the system adapts to the common misspellings or confusion sets of the user.

33. The method of claim 1, wherein the user can enter partial syllables for each of the multiple syllable words.

34. The method of claim 33, wherein the number of partial keystrokes for each syllable is one.

35. The method of claim 1, wherein the user identifies an initial sound and a final sound.

36. The method of claim 1, wherein one of the plurality of inputs is associated with a special wildcard input that is associated with zero or one of said phonetic characters.

37. The method of claim 1, where the phonetic sequences comprise matching entries in any of English, and other alphabetic languages.

38. A system for disambiguating ambiguous input sequences entered by a user and generating textual output in Chinese language, said system comprising:
  a user input device having a plurality of input means, each of said input means being associated with a plurality of phonetic characters, an input sequence being generated each time when an input is selected by said user input device, said generated input sequence having a textual interpretation that is ambiguous due to the plurality of phonetic characters associated with said inputs;
  a database containing a plurality of input sequences and, associated with each input sequence, a set of phonetic sequences whose spellings correspond to the input sequence;
  a database containing a plurality of phonetic sequences and, associated with each phonetic sequence, a set of ideographic character sequences which correspond to the phonetic sequences;
  means for comparing the input sequence with said phonetic sequence database and finding matching phonetic entries;
  means for matching said phonetic entries with said ideographic database; and
  an output device for displaying one or more matched phonetic entries and matched ideographic characters.

39. The system of claim 38, further comprising:
  means for prioritizing phonetic sequences that match an input sequence and prioritizing ideographic sequences that match a matching phonetic sequence according to a linguistic model.

40. The system of claim 39, wherein said linguistic model comprises at least one of:
  number of total keystrokes in an ideograph;
  radical of an ideograph;
  radical and number of strokes of radical;
  alphabetically ordered;
  frequency of occurrence of ideographic sequences or phonetic sequences in formal or conversational written text;
  frequency of occurrence of ideographic sequences or phonetic sequences when following a preceding character or characters;
  proper or common grammar of the surrounding sentence;
  application context of current input sequence entry; and
  recency of use or repeated use of phonetic or ideographic sequences by the user or within an application program.

41. The system of claim 39, further comprising:
  means for changing the associated priority of the matching phonetic sequence, and sequence of ideographic characters once an ideographic character sequence is selected.

42. The system of claim 39, wherein the matches between the input sequence and the phonetic sequences are part of confusion sets.

43. The system of claim 42, wherein the user can select which confusion sets are active.

44. The system of claim 43, wherein one of the plurality of inputs is associated with providing alternative phonetic sequence interpretations of the input sequence based on confusion sets or misspellings.

45. The system of claim 42, wherein the system adapts to the common misspellings or confusion sets of the user.

46. The system of claim 38, wherein said set of phonetic characters comprises the Latin alphabet.

47. The system of claim 38, wherein said set of phonetic characters comprises the Bopomofo alphabet also known as Zhuyin.

48. The system of claim 47, wherein once a selection has been made the matching input sequence, the matching phonetic sequence and the matching ideographic sequence is added to memory.

49. The system of claim 38, wherein said phonetic sequences comprise single syllables.

50. The system of claim 38, wherein said phonetic sequences comprise both single and multi-syllables.

51. The system of claim 38, wherein said phonetic sequences comprise user generated sequences.

52. The system of claim 38, wherein said phonetic syllables and said corresponding ideographic characters are stored in a single tree.

53. The system of claim 38, wherein all monosyllabic phonetic syllables are stored in a single tree and the corresponding phonetic syllables that form a word or phrase and one or more ideographic characters that match said word or phrase are stored in a single tree.

54. The system of claim 38, wherein an object is added to a custom database if an object does not exist for an input sequence.

55. The system of claim 54, wherein in absence of matching phonetic sequences in said database, a sequence of matching phonetic sequences is automatically generated based on single and optionally multi-syllable phonetic sequences.

56. The system of claim 55, wherein said sequence of matching phonetic sequences is narrowed down through user interaction.

57. The system of claim 55, wherein a sequence of matching ideographic sequences is automatically generated based on matching phonetic sequences to ideographic sequences.

58. The system of claim 57, wherein a sequence of matching ideographic sequences is narrowed down through user interaction.

59. The system of claim 54, wherein a desired phonetic sequence and corresponding ideographic character sequence are specified through a second selection mechanism.

60. The system of claim 38, wherein the user can specify a particular tone for the phonetic syllable.

61. The system of claim 60, wherein one of the plurality of inputs is associated with a special wildcard input that is associated with any or all tones.

62. The system of claim 38, wherein the user can specify an explicit syllable separator.

63. The system of claim 38, wherein once the user enters a sequence of phonetic characters, the user is returned a sequence of phonetic sequences of exact matches and predictions that partially match.

64. The system of claim 63, wherein the sequence is ordered according to the frequency of use based on a linguistic model.

65. The system of claim 64, wherein said linguistic model comprises at least one of:
number of total keystrokes in an ideograph;
radical of an ideograph;
radical and number of strokes of radical;
alphabetically ordered;
frequency of occurrence of phonetic sequences or ideographic sequences in formal or conversational written text;
frequency of occurrence of phonetic sequences or ideographic when following a preceding character or characters;
proper or common grammar of the surrounding sentence;
application context of current character sequence entry; and
recency of use or repeated use of phonetic sequences by the user or within an application program.

66. The system of claim 38, wherein once the user has selected a sequence of ideographic characters, the user is presented with a list of sequences of one or more ideographic characters.

67. The system of claim 66, wherein said list of sequences is ordered according to the frequency of use based on a linguistic model.

68. The system of claim 67, where said linguistic model comprises at least one of:
number of total keystrokes in an ideograph;
radical of ideograph;
radical and number of strokes of radical;
alphabetically ordered;
frequency of occurrence of ideographic characters in formal or conversational written text;
frequency of occurrence of ideographic characters when following a preceding character or characters;
proper or common grammar of the surrounding sentence;
application context of current character entry; and
recency of use or repeated use of ideographic characters by the user or within an application program.

69. An ideographic language text input system incorporated in a user input device, comprising:
a plurality of inputs, each of the plurality of inputs associated with a plurality of characters, an input sequence being generated each time an input is selected by manipulating the user input device, wherein a generated input sequence corresponds to a sequence of inputs that have been selected;
at least one selection input for generating an object output, wherein an input sequence is terminated when the user manipulates the user input device to a selection input;
a memory containing a plurality of objects, wherein each of the plurality of objects is associated with an input sequence;
a display to depict system output to the user; and
a processor coupled to the user input device, memory, and display, said processor comprising:
identifying means for identifying from the plurality of objects in the memory any object associated with each generated input sequence;
output means for displaying on the display the character interpretation of any identified objects associated with each generated input sequence; and
selection means for selecting the desired character for entry into a text entry display location upon detecting the manipulation of the user input device to a selection input.

70. The system of claim 69, wherein said selection means selects a desired character based upon identification of objects having a highest priority based on a linguistic model.

71. The system of claim 69, wherein each time a phrase or ideographic sequence is selected, input sequences for phrases and ideographic sequences that comprise are reprioritized.

72. The system of claim 69, wherein an object is added to a memory if an object does not exist for an input sequence.

73. The system of claim 69, wherein one of the plurality of inputs is associated with a special wildcard input that is associated with any or all tones and delimiter.

74. A system for disambiguating ambiguous input sequences entered by a user and generating textual output in Chinese language, said system comprising:
a user input device having a plurality of input means, each of said input means being associated with a plurality of Latin alphabets, an input sequence being generated each time when an input is selected by said user input device, said generated input sequence having a textual interpretation that is ambiguous due to the plurality of Latin alphabets associated with said inputs;
a memory containing data used to construct a plurality of Pinyin spellings, each of said Pinyin spellings being associated with an input sequence and a frequency of use based on a linguistic model, and each of said Pinyin spellings comprising a sequence of Pinyin syllables corresponding to a phonetic reading to be output to the user, wherein said Pinyin spellings are constructed from data stored in said memory in a tree structure comprised of a plurality of nodes, each of said nodes being associated with an input sequence;
a display to depict system output to the user; and
a processor coupled to said user input device, said memory and said display, said processor constructing a Pinyin spelling from said data in said memory associated with each input sequence and identifying at least one candidate Pinyin spelling with the highest frequency of use based on a linguistic model, and generating an output signal causing said display to display said at least one identified candidate Pinyin spelling associated with each generated input sequence as a textual interpretation of said generated sequence.

75. The system of claim 74, wherein one or more Pinyin spelling objects in said tree structure in memory is associated with one or more Chinese phrases, wherein each Chinese phrase is a textual interpretation of said associated Pinyin spelling object, and wherein each Chinese phrase object is associated with a frequency of use based on a linguistic model.

76. The system of claim 75, wherein said processor constructs at least one identified candidate Chinese phrase for a selected Pinyin spelling and generates an output signal causing said display to display said at least one identified candidate Chinese phrase associated with said selected Pinyin spelling associated with each generated input sequence as a textual interpretation of said generated sequence.

77. The system of claim 76, wherein said at least one identified Chinese phrase has a Pinyin spelling exactly matching said selected Pinyin spelling.

78. The system of claim 76, wherein said at least one identified Chinese phrase has a Pinyin spelling exactly matching all syllables except the last syllable of said selected Pinyin spelling and the last syllable of the Pinyin of said identified Chinese phrase is a completed syllable that can be extended from the last syllable of said selected Pinyin spelling.

79. The system of claim 76, wherein said frequency of use based on a linguistic model associated with each Pinyin spelling object corresponds to a sum of the frequencies of use of all Chinese phrase objects associated with said Pinyin spelling object.

80. The system of claim 79, wherein said Pinyin spelling with the highest frequency of use based on a linguistic model is a default Pinyin spelling selection.

81. The system of claim 75, wherein a Chinese phrase with the highest frequency of use based on a linguistic model is a default Chinese phrase selection.

82. The system of claim 75, wherein at least one or more of said plurality of inputs is an unambiguous navigation input; and
wherein the user may search for next set of Chinese phrases corresponding to a selected Pinyin spelling as interpretation of an input sequence by additional selections of said navigation inputs, each selection of said unambiguous navigation inputs displaying an alternate list of Chinese phrases corresponding to said selected Pinyin spelling in said memory associated with said generated input sequence.

83. The system of claim 74, wherein at least one or more of said plurality of inputs is an unambiguous navigation input and
wherein the user may select an alternate Pinyin spelling as interpretation of an input sequence by additional selections of said navigation inputs, each selection of said unambiguous navigation inputs selecting a Pinyin spelling object from said identified one or more Pinyin spelling objects in said memory associated with said generated input sequence.

84. The system of claim 74, wherein said user input device comprises an additional input which can be activated to input a tone for a Pinyin syllable.

85. The system of claim 84, wherein one or more Pinyin syllables including tones are associated with the same input with which the corresponding Pinyin syllables are input without tones.

86. The system of claim 85, wherein the tones of each of the Chinese characters are also stored in the memory; and
wherein only Chinese phrases with characters which have tones matched corresponding input tones are outputted to the user.

87. The system of claim 74, wherein an object is added to a custom database if an object does not exist for an input sequence.

88. The system of claim 87, wherein in absence of matching phonetic sequences in said database, a sequence of matching phonetic sequences is automatically generated based on single and optionally multi-syllable phonetic sequences.

89. The system of claim 88, wherein said sequence of matching phonetic sequences is narrowed down through user interaction.

90. The system of claim 89, wherein a sequence of matching ideographic sequences is automatically generated based on matching phonetic sequences to ideographic sequences.

91. The system of claim 90, wherein a sequence of matching ideographic sequences is narrowed down through user interaction.

92. The system of claim 91, wherein once a selection has been made the matching input sequence, the matching phonetic sequence and the matching ideographic sequence are added to the memory.

93. The system of claim 74, further comprising:
means for changing the associated priority of the matching phonetic sequence, and sequence of ideographic characters once an ideographic character sequence is selected.

94. The system of claim 74, wherein a desired phonetic sequence and corresponding ideographic character sequence are specified through a second selection mechanism.

95. The system of claim 74, wherein one of the plurality of inputs is associated with a special wildcard input that is associated with any or all tones.

96. The system of claim 74, wherein the user can specify an explicit syllable separator.

97. The system of claim 74, wherein once the user enters a sequence of phonetic characters, the user is returned a sequence of phonetic sequences of exact matches and predictions that partially match.

98. The system of claim 97, wherein the sequence is ordered according to the frequency of use based on a linguistic model.

99. The system of claim 98, where said linguistic model comprises at least one of:
number of total keystrokes in an ideograph;
radical of an ideograph;
radical and number of strokes of radical;
alphabetically ordered;
frequency of occurrence of phonetic sequences or ideographic sequences in formal or conversational written text;
frequency of occurrence of phonetic sequences or ideographic when following a preceding character or characters;
proper or common grammar of the surrounding sentence;
application context of current character sequence entry; and
recency of use or repeated use of phonetic sequences by the user or within an application program.

100. The system of claim 74, wherein once the user has selected a sequence of ideographic characters, the user is presented with a list of sequences of one or more ideographic characters.

101. The system of claim 100, wherein said list of sequences is ordered according to the frequency of use based on a linguistic model.

102. The system of claim 101, wherein said linguistic model comprises at least one of:
number of total keystrokes in an ideograph;
radical of an ideograph;
radical and number of strokes of radical;
alphabetically ordered;
frequency of occurrence of ideographic characters in formal or conversational written text;
frequency of occurrence of ideographic characters when following a preceding character or characters;
proper or common grammar of the surrounding sentence;
application context of current character entry; and
recency of use or repeated use of ideographic characters by the user or within an application program.

103. The system of claim 74, wherein the matches between the input sequence and the phonetic sequences are part of confusion sets.

104. The system of claim 103, wherein the user can select which confusion sets are active.

105. The system of claim 104, wherein one of the plurality of inputs is associated with providing alternative phonetic sequence interpretations of the input sequence based on confusion sets or misspellings.

106. The system of claim 103, wherein the system adapts to the common misspellings or confusion sets of the user.

* * * * *